US012600877B2

(12) United States Patent
Ren et al.

(10) Patent No.: US 12,600,877 B2
(45) Date of Patent: Apr. 14, 2026

(54) HIGH-TEMPERATURE CU INK-BASED CONDUCTOR WITH OXIDATION AND CORROSION RESISTANCE

(71) Applicant: The Research Foundation for The State University of New York, Amherst, NY (US)

(72) Inventors: Shenqiang Ren, Williamsville, NY (US); Aaron Sheng, Buffalo, NY (US); Saurabh Khuje, Amherst, NY (US)

(73) Assignee: The Research Foundation for The State University of New York, Amherst, NY (US)

(*) Notice: Subject to any disclaimer, the term of this patent is extended or adjusted under 35 U.S.C. 154(b) by 0 days.

(21) Appl. No.: 18/564,076

(22) PCT Filed: May 25, 2022

(86) PCT No.: PCT/US2022/030905
§ 371 (c)(1),
(2) Date: Nov. 25, 2023

(87) PCT Pub. No.: WO2023/287492
PCT Pub. Date: Jan. 19, 2023

(65) Prior Publication Data
US 2024/0270995 A1 Aug. 15, 2024

Related U.S. Application Data

(60) Provisional application No. 63/193,025, filed on May 25, 2021.

(51) Int. Cl.
*C09D 11/52* (2014.01)
*C09D 11/037* (2014.01)

(52) U.S. Cl.
CPC ............ *C09D 11/52* (2013.01); *C09D 11/037* (2013.01)

(58) Field of Classification Search
CPC ....... C09D 11/52; C09D 11/037; C09D 11/14; H01B 1/22
See application file for complete search history.

(56) References Cited

U.S. PATENT DOCUMENTS

2016/0137865 A1    5/2016  Kwon et al.
2018/0362790 A1*  12/2018  Watanabe .............. C09D 11/52
2019/0382607 A1   12/2019  Sato et al.

FOREIGN PATENT DOCUMENTS

CN      106167654 A      11/2016
CN      107337965 B       3/2020
(Continued)

OTHER PUBLICATIONS

Kim, M. J., et al., Isotropic Adsorption Causes Anisotropic Growth of Copper Microplates, Chemistry of Materials, Dec. 7, 2020, vol. 33, pp. 881-891.
(Continued)

*Primary Examiner* — Mark Kopec
*Assistant Examiner* — Jaison P Thomas
(74) *Attorney, Agent, or Firm* — Hodgson Russ LLP

(57) ABSTRACT

Provided are conductive slurries with copper nanoplates. The copper nanoplates may be functionalized with formate groups and/or graphene or a graphene material. The slurries may be used as conductive inks, which may be used in 3D printing applications. Also provided are methods of making and using same.

11 Claims, 29 Drawing Sheets

(56) References Cited

FOREIGN PATENT DOCUMENTS

| EP | 4306234 A1 * | 1/2024 | .............. B22F 1/068 |
|----|----|----|----|
| KR | 102074855 B1 | 2/2020 | |
| WO | 2020/047500 A1 | 3/2020 | |
| WO | 2022/165086 A1 | 8/2022 | |

OTHER PUBLICATIONS

Sheng, A., et al., Copper Nanoparticles for Printing Flexible High-Temperature Conductors, Applied Nano Materials, Feb. 22, 2022, vol. 5, pp. 4028-4037.

Lee, J.W., 2D Single-Crystalline Copper Nanoplates as a Conductive Filler for Electronic Ink Applications, Small, Dec. 20, 2017, vol. 14, iss. 8, pp. 1-7.

Li, Z., et al., Printable Copper Sensor Electronics for High Temperature, ACS Appl. Electron. Mater., Jun. 30, 2020, vol. 2, pp. 1867-1873.

* cited by examiner 12 hrs at 100 °C

| Bottle Size (mL) | Sample volume (mL) | Study #1: Resulting ink (g) | Study #2: Resulting ink (g) | Average Yield (g) |
|---|---|---|---|---|
| 250 | 175 | 0.441 | 0.58 | 0.51 |
| 500 | 350 | 1.036 | 0.89 | 0.96 |
| 1000 | 700 | 1.691 | 1.55 | 1.62 |
| 2000 | 1400 | 2.80 | 2.43 | 2.62 |

Cu 2p3 5

Cu 2p3 5

Sheet resistance/Conductivity vs Sintering Temperature

The print sintered at 500 degrees had the smallest thickness

Separation of ink and solvent

Higher HPMC concentration shows more promise.

Formate coating

Formate coating (continued)

The coppers after submerged in 0.5 M NaOH solution for ~ 3 days

Back (Pristine copper nanoplates)

Front (submerged in solution)

HIGH-TEMPERATURE CU INK-BASED CONDUCTOR WITH OXIDATION AND CORROSION RESISTANCE

CROSS REFERENCE TO RELATED APPLICATION

This application is a National Phase entry of International Application No. PCT/US2022/030905, filed May 25, 2022, which claims priority to U.S. Provisional Application No. 63/193,025, filed May 25, 2021, the disclosures of which are incorporated herein by reference.

STATEMENT REGARDING FEDERALLY SPONSORED RESEARCH OR DEVELOPMENT

This invention was made with government support under grant no. W911NF-20-2-0016 awarded by the U.S. Army Research Laboratory and under agreement no. FA8650-20-2-5506 awarded by the U.S. Air Force Research Laboratory. The government has certain rights in the invention.

BACKGROUND OF THE DISCLOSURE

Advanced electronics are undergoing a paradigm shift to increase its printability, portability, miniaturization, and versatility in different environments. Simultaneously, electrical conducting materials, like metals, must complement the shift towards reliable, highly resistant, and high performance conductors under extreme environments such as high temperatures and in reactive atmospheres. Achieving such disparate functionalities will require rational design and manufacturing of the conductor material and its hierarchical structures. However, traditional metal conductors are energetically expensive to produce and are susceptible to extreme environments, creating a challenge for next-generation flexible electronics applications. Printable electronics, on the other hand, allows miniaturizing of electronic devices to be increasingly versatile and portable. However, the difficulties lie in the nanoscaled materials used, where the higher surface-to-volume ratios lead to lower melting points and greater susceptibility to oxidation and corrosion, relative to their bulk counterparts. In addition, the two most common types of conductors have diametrically opposite properties: Higher melting point with lower conductivities (e.g., tungsten and nickel) and lower melting points with higher conductivities (e.g., silver and gold). One promising metal conductor is copper, an ubiquitous electrically conductive material used in electronics, with high conductivities and a melting point higher than most other highly conductive metals, and is significantly more abundant and inexpensive. Nonetheless, a rudimentary issue with bulk copper materials is their high susceptibility to oxidation under ambient conditions. Despite the tremendous success of energetically expensive fabrication of copper conductors through electroplating or alloying, printable copper conductors with the controlled feature dimensions have been highly sought after. As such, there is a need for developing a new printable conductive material with amplified electric performance and stability.

SUMMARY OF THE PRESENT DISCLOSURE

Copper has attracted immense interest in advanced electronics attributed to its abundance, high electrical and thermal characteristics. However, the ease of oxidation when subjected to heat and humidity drastically limit its material reliability under extreme environments, which require continuous operation at elevated temperatures and in reactive atmospheres. Described herein is the hybridization strategies for achieving a thermally stable (upwards of 1300° C.), anti-oxidation and -corrosion printed conductor by utilizing two-dimensional single-crystalline copper (111) nanoplates as the building block, with the capability of being additively manufactured on flexible ceramics. Anti-oxidative copper nanostructures with a low sheet resistance of 4 mΩ/sq/mil were prepared by means of surface coordinated formate ligands that inculcates high oxidation and corrosion resistance on a molecular level, enabling continuous operation under atmospheric conditions up to 350° C. In addition, a rapid in-situ copper-graphene conversion led to a hybridized conductor, which displays stability at elevated temperatures up to 1300° C., substantially exceeding the melting point of bulk copper (1084° C.) with high ampacity. Further mechanistic studies revealed a clear indication of in-situ graphene conversion via X-ray photoelectron spectroscopy and high temperature stability from copper and graphene interfaces, as well as preferential stacking of copper nanoplates. These improved characteristics of copper at high temperatures are distinctly suited for the emerging high temperature electronics with the recent surge of portable, flexible, miniaturized and versatile smart electronics.

The present disclosure provides compositions, composite structures, and uses thereof.

In an aspect, the present disclosure provides compositions. In various examples, the composition is made by a method of the present disclosure. Non-limiting examples of compositions are provided herein. A composition may be referred to as a conductive slurry or a conductive slurry composition. The conductive slurry may be a conductive ink, printable conductive ink, or a conductive ink composition.

In an aspect, the present disclosure provides a method of making a conductive slurry composition of the present disclosure.

In an aspect, the present disclosure provides a method for printing a conductive ink.

In an aspect, an object (e.g., conductor) may be printed (e.g., 3D printed) from a conductive slurry composition of the present disclosure. The printed object may be passivated with, for example, formate groups, which may be desirable for the printed (e.g., solid) object.

In various examples, an article of manufacture is printed from the conductive slurry of the present disclosure. The article of manufacture may comprise one or more component, which may be a passive component or components (e.g., conductor(s), wire(s), and the like, and combinations thereof) and/or an active component or components (e.g., antennas, relays, switch leads, RF shields, and the like, and combinations thereof), comprising the nanoplates of the present disclosure. The nanoplates may be useful for producing electrodes.

BRIEF DESCRIPTION OF THE FIGURES

For a fuller understanding of the nature and objects of the disclosure, reference should be made to the following detailed description taken in conjunction with the accompanying figures.

FIG. 9 shows (a) sheet resistance vs thickness on a linear scale. Conductivity measurements before (left bars) and after (right bars) sintering at varying sintering temperature (b) and time (c). (d) Shows the conductivity overtime for Cu prints at varying sintering times. On a linear scale, any thickness above 100 µm shows minimal difference in sheet resistance. The conductivities before and after for sintering temperature (b) and time (c) displays the increase of conductivity by at almost 100 fold. While the conductors were printed at the same time, the difference in initial (before) conductivities are due to when the prints were sintered. Prints used for varying sintering temperatures were sintered first, then prints used for varying sintering time were sintered later, with at least two weeks in-between.

DETAILED DESCRIPTION OF THE DISCLOSURE

Figure 1:
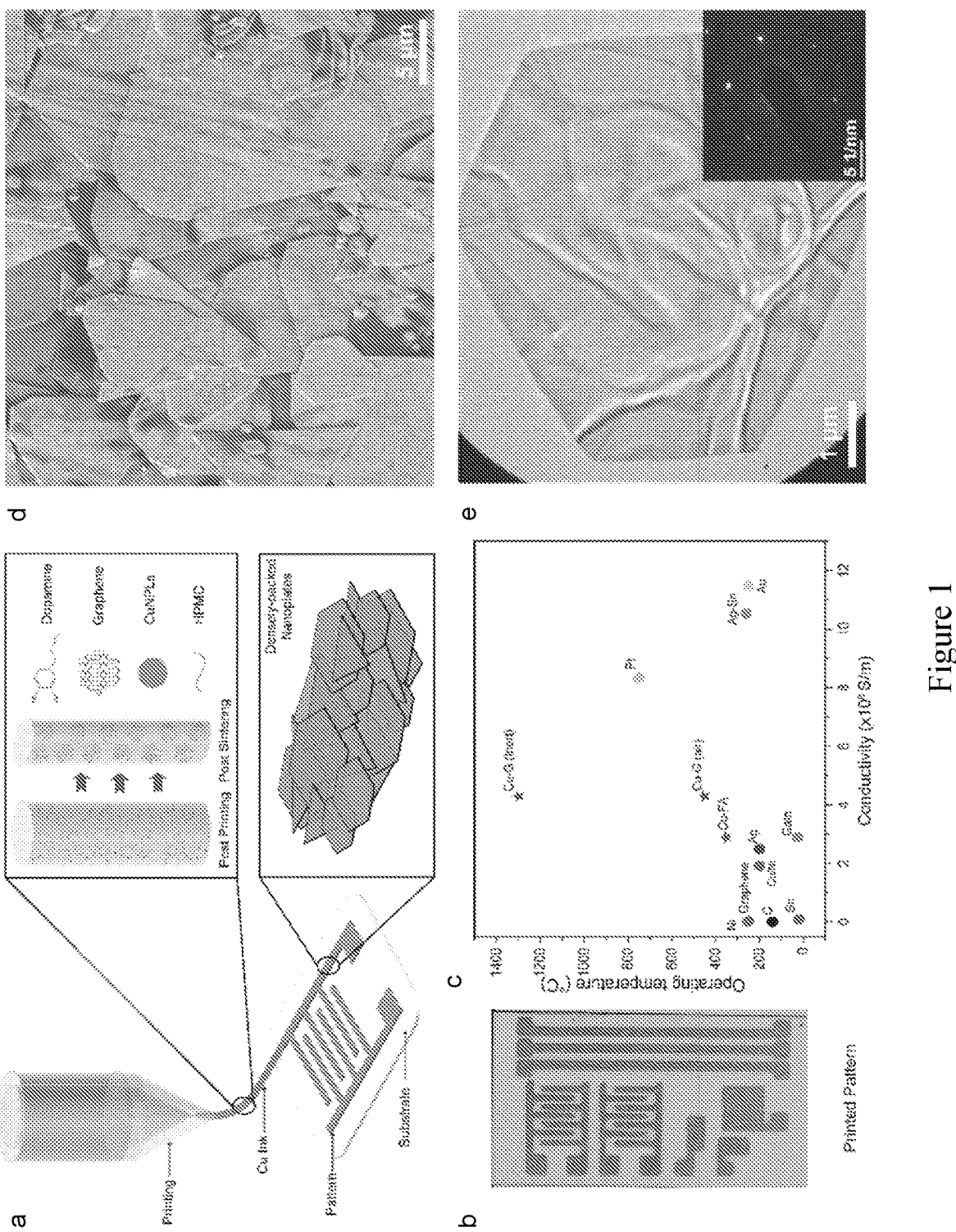
FIG. 1 shows (a) a schematic depicting the process of obtaining printed conductors. The HPMC is burned off during sintering, and the dopamine converts into graphene. (b) The image shows the final product of the printed sample. (c) Ashby plot of operating temperature vs conductivity for different printable inks which have been investigated (Pt, GaIn, Au, Sn, Cu/Ni, Graphene, Ag—Sn), or is commercially available (Ag, C, Ni). The red stars are printed conductors discusses in this work. (d) SEM and (e) TEM image of a Cu NPL. The (e, inset) selected area electron diffraction (SAED) pattern of Cu NPL from (e).

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

All ranges provided herein include all values that fall within the ranges to the tenth decimal place, unless indicated otherwise.

Copper has attracted immense interest in advanced electronics attributed to its abundance, high electrical and thermal characteristics. However, the ease of oxidation when subjected to heat and humidity drastically limit its material reliability under extreme environments, which require continuous operation at elevated temperatures and in reactive atmospheres. Described herein is the hybridization strategies for achieving a thermally stable (upwards of 1300° C.), anti-oxidation and -corrosion printed conductor by utilizing two-dimensional single-crystalline copper (111) nanoplates as the building block, with the capability of being additively manufactured on flexible ceramics. Anti-oxidative copper nanostructures with a low sheet resistance of 4 mΩ/sq/mil were prepared by means of surface coordinated formate ligands that inculcates high oxidation and corrosion resistance on a molecular level, enabling continuous operation under atmospheric conditions up to 350° C. In addition, a rapid in-situ copper-graphene conversion led to a hybridized conductor, which displays stability at elevated temperatures up to 1300° C., substantially exceeding the melting point of bulk copper (1084° C.) with high ampacity. Further mechanistic studies revealed a clear indication of in-situ graphene conversion via X-ray photoelectron spectroscopy and high temperature stability from copper and graphene interfaces, as well as preferential stacking of copper nanoplates. These improved characteristics of copper at high temperatures are distinctly suited for the emerging high temperature electronics with the recent surge of portable, flexible, miniaturized and versatile smart electronics.

The present disclosure provides compositions, composite structures, and uses thereof.

In an aspect, the present disclosure provides compositions. In various examples, the composition is made by a method of the present disclosure. Non-limiting examples of compositions are provided herein. A composition may be referred to as a conductive slurry or a conductive slurry composition. The conductive slurry may be a conductive ink, printable conductive ink, or a conductive ink composition.

In various examples, the conductive slurry composition comprises copper nanoplates. In various examples, the conductive slurry composition does not comprise copper nanowires. The copper nanoplates may further comprise one or more layers of graphene or a graphene-material or a formate layer.

Various amounts of copper nanoplates are used. In various examples, the copper nanoplates are present at 10 to 30 wt. % in the conductive slurry composition (based on the total weight of the conductive slurry composition including water), including all 0.1 wt. % values and ranges therebetween. This weight percent further includes any functionalization on the nanoplates, such as functionalize with graphene or formate.

In various examples, the majority of the copper in the conductive slurry composition has a nanoplates morphology. In various examples, less 10 wt. % of the copper has a nanowire morphology (e.g., less than 10 wt. %, less than 9 wt. %, less than 8 wt. %, less than 7 wt. %, less than 6 wt. %, less than 5 wt. %, less than 4 wt. %, less than 3 wt. %, less than 2 wt. %, less than 1 wt. %, or no detectable amount of nanowires).

The copper nanoplates of the conductive slurry composition may have a variety of lengths and thicknesses. For example, the copper nanoplates may have a longest linear dimension (e.g., a length) of 100 nm to 10 μm, including all 0.1 nm values and ranges therebetween. In various examples, the copper nanoplates have a thickness of 10 to 100 nm, including all 0.1 values and ranges therebetween (e.g., 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm). In various embodiments, the dimensions are roughly uniform or uniform across the length of an axis of a nanoplate (e.g., the thickness is 15 nm across the entire length of a nanoplates).

The copper nanoplates may comprise copper or a copper alloy. In various examples, the copper alloy is chosen from a copper gold alloy, a copper silver alloy, a copper zinc alloy, a copper aluminum alloy, a copper nickel alloy, and a copper platinum alloy.

In various examples, the copper nanoplates further comprise iodide. The iodide may adsorb onto the {111} facets. Without intending to be bound by any particular theory, it is considered the adsorption of the iodide forces growth parallel to the basal plane, which in turn results in plate formation rather than wire formation.

Various liquids, which may be referred to as dispersants or solvents, can be used to form a slurry of copper nanoplates. In various examples, the liquid is water, an organic liquid, such as, for example, a $C_1$ to $C_6$ alcohol (e.g., ethanol), diethylene glycol butyl ether, 2-ethoxyethyl acetate, 2-butoxyethyl acetate, diethylene glycol monobutyl ether acetate, dibasic ester mixture, Terpineol, or a combination thereof.

A conductive slurry composition can comprise various amounts of liquids. In various examples, a dispersion comprises 10 to 70 wt. % of a liquid based on the total weight of the composition, including all wt. % values and ranges therebetween (e.g., 10, 11, 12, 13, 14, 15, 16, 17, 18, 19, 20, 21, 22, 23, 24, 25, 26, 27, 228, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt. %). It is desirable to use an amount of liquid that forms a dispersion or slurry.

The conductive slurry composition may further comprise one or more additive. Without intending to be bound by any particular theory, it is considered that the additive improves the flowability and/or viscosity of the slurry, which may be used as an ink, for example, an ink for printing. Non-limiting examples of additives include water-soluble primary amines (e.g., alkylamines, such as, for example, $C_{10}$-$C_{20}$ alkyl amines (hexadecylamines)). An additive or additives may be present in a dispersion at 1 to 10 wt. % based on the total weight of the conductive slurry composition.

The conductive slurry may further comprise (hydroxypropyl)methyl cellulose (HPMC). The concentration of the HPMC may be 0.1 to 10 weight percent, relative to the total weight of the conductive ink, including all 0.01 weight percent values and ranges therebetween.

In various examples, the copper nanoplates are functionalized with graphene or a graphene material. In various other examples, the copper nanoplates are surface functionalized with one or more formate groups.

Various ratios of copper nanoplates weight to the graphene material and/or graphene-precursor material can be used. In various examples, the ratio of the nanoplate weight to the graphene material and/or graphene-precursor material weight is 95:5 to 99.9:0.1, including all 0.1 ratio values and ranges therebetween.

Various graphene materials may be used. Combinations of graphene materials may be used. Non-limiting examples of graphene materials include graphene, reduced graphene oxide, and combinations thereof. The graphene materials may be exfoliated sheets. Non-limiting examples of exfoliated sheet graphene materials include exfoliated graphene sheets, exfoliated reduced graphene sheets, exfoliated graphene oxide sheets, and combinations thereof. Suitable graphene materials are known in the art and are commercially available or can be made by processes known in the art.

Graphene-material precursors react or decompose (e.g., thermally react or thermally decompose) to form a graphene material. Various graphene material precursors may be used. Combinations of graphene material precursors may be used. A graphene-material precursor may be an organic small molecule. Non-limiting examples of graphene-material precursors include dopamine, aniline, and the like, and combinations thereof.

In various embodiments, the conductive slurry is a conductive ink.

The nanoplates may either be functionalized with graphene/graphene materials or formate groups. In various embodiments, a nanoplate is functionalized with both graphene/graphene materials and formate groups.

The nanoplates may have one or more desirable properties. Non-limiting examples of desirable properties include an electrical conductivity, thermal conductivity, heat dissipation, breakdown current, mechanical properties (e.g., Young's modulus), and the like, and combinations thereof. In various examples, the nanoplates exhibit an electrical conductivity of 1 MS/m to 35 MS/m.

In an aspect, the present disclosure provides a method of making a conductive slurry composition of the present disclosure.

In various embodiments, the method comprises contacting a copper salt, an aliphatic amine, D-glucose or ascorbic acid, an iodide salt, and water to form a reaction mixture; and heating the reaction mixture to form a conductive slurry composition of the present disclosure.

Various copper salts may be used in the method. For example, the copper salt may be a copper (I) or a copper (II) salt. For example, a copper (I) salt may be cuprous (I) chloride. For example, a copper (II) salt may be copper(II) chloride or copper(II) bromide. In various examples, the copper salt may be a combination of various copper salts described herein.

Various aliphatic amines may be used in the method. For example, the aliphatic amine may have 10 to 20 carbon atoms and may be linear or branched and/or have various degrees of unsaturation. In various embodiments, the aliphatic amine is hexadecylamine (HDA).

In various embodiments, one or more additives may be added during the method. In various examples, the method may further comprise mixing HPMC with water into the reaction mixture.

The reaction mixture may be heated for various lengths of time and at various temperatures. For example, the reaction mixture is heated for a period of time ranging from 5-48 hours, including all second values and ranges therebetween (e.g., (e.g., 6, 9, 9.5, 10, 11, 12, 13, 18, 19, 20, 25, 30, 35, 40, 45, or 48 hours). In various examples, the reaction mixture is maintained at a constant temperature for the full period of time. In various embodiments, the reaction mixture is at a temperature of 60° C. to 140° C., including all 0.1 values and ranges therebetween (e.g., the temperature is at least 100° C. or is heated to a temperature of 100° C. or less).

In various embodiments, the method further comprises functionalizing the copper nanoplates with formate groups. Functionalization may be achieved by adding a mixture comprising one or more formate salts to the conductive slurry composition and heating the mixture of the conductive slurry composition and the formate salt mixture to a temperature of 100 to 150° C., including all 0.1° C. values and ranges therebetween. The formate salts may be sodium formate, copper formate, or a combination thereof. The mixture comprising one or more formate salts may ethylene glycol (e.g., 50 mL of ethylene glycol) and a solution comprising sodium formate (e.g., 30 g of sodium formate) and copper formate (e.g., 15 mg copper formate) in water (e.g., 150 ml of water).

In various embodiments, the method further comprises functionalizing the copper nanoplates with graphene or a graphene material. The functionalization may be achieved by blending the copper nanoplates with graphene or graphene derivatives or the graphene is prepared in situ via conversion from dopamine. For example, functionalization may be achieved by dispersing graphene or a graphene material into the slurry and sonicating the mixture of the slurry and graphene or a graphene material.

In various examples, the method comprises using the following: the copper salt is provided as 2.4 g of copper(II) chloride; 3.9 g D-glucose; the aliphatic amine is 14.55 g of HDA; the iodide salt is provided as 90 mg of NaI; and 900 mL water.

In an aspect, the present disclosure provides a method for printing a conductive ink.

The method may comprise extruding a conductive ink composition and washing the extruded ink with an acid to remove residual aliphatic amine. The acid may be an organic acid or an organic acid solvent.

Various aqueous organic acid solutions can be used. An aqueous organic acid solution comprises water and one or more organic acid. Non-limiting examples of organic acids include alkylcarboxylic acids (e.g., $C_1$-$C_8$ alkylcarboxlic acid, such as, for example, acetic acid, and the like).

Various organic solvent acid solutions can be used. An organic solvent acid solution comprises one or more alcohol and one or more organic acid. Non-limiting examples of alcohols include $C_1$-$C_5$ alcohols (e.g., ethanol, and the like, and combinations thereof). Non-limiting examples of organic acids include alkylcarboxylic acids (e.g., a $C_6$-$C_{15}$ alkylcarboxlic acid, such as, for example, dodecanoic acid, and the like).

In an aspect, an object (e.g., conductor) may be printed (e.g., 3D printed) from a conductive slurry composition of the present disclosure. The printed object may be passivated with, for example, formate groups, which may be desirable for the printed (e.g., solid) object.

In various examples, an article of manufacture is printed from the conductive slurry of the present disclosure. The article of manufacture may comprise one or more component, which may be a passive component or components (e.g., conductor(s), wire(s), and the like, and combinations thereof) and/or an active component or components (e.g., antennas, relays, switch leads, RF shields, and the like, and combinations thereof), comprising the nanoplates of the present disclosure. The nanoplates may be useful for producing electrodes.

The article of manufacture may be an electrical device. Non-limiting examples of electrical devices include electrical motors, electrical generators, transformers, switching regulators, converters, inverters, charging circuits, discharge circuits, PCL control devices, transmission and distribution units (which may be high-voltage transmission or distribution units), circuit breakers, and the like. Additional non-limiting examples include consumer electronic devices (e.g., computer, cellular phone, and the like), home appliance devices (e.g., television, washers, dryers, and the like), solar cells, sensor devices (e.g., wireless sensor devices), control devices, amplifiers, attenuators, Internet of Things (IOT) devices, audio devices, RFID devices, illuminating devices, and the like.

An electrical device or electronic devices may comprise one or more component that comprises one or more nanocomposite. Non-limiting examples of components include antennas, contacts, conductors, relays, switch leads, RF shields, and the like.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

The following Statements are examples of the present disclosure and are not intended to be limiting in any way.

Statement 1. A conductive slurry composition comprising a slurry of copper nanoplates in water. In various examples, the composition comprises less than 10 wt. % copper nanowires.

Statement 2. A conductive slurry composition according to Statement 1, wherein the copper nanoplates have a longest linear dimension (e.g., length) of 100 nm to 10 μm, including all 0.1 nm values and ranges therebetween.

Statement 3. A conductive slurry composition according to Statement 1 or Statement 2, wherein the copper nanoplates have a thickness of 1 to 20 nm, including all 0.1 nm values and ranges therebetween or a thickness of 10 to 100 nm, including all 0.1 values and ranges therebetween (e.g., 10, 11, 12, 13, 14, 15, 16, 17, 18, 19, 20, 21, 22, 23, 24, 25, 26, 27, 228, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm).

Statement 4. A conductive slurry composition according to any one of the preceding Statements, wherein the copper nanoplates comprise copper or a copper alloy.

Statement 5. A conductive slurry composition according to Statement 4, wherein the copper alloy is a copper gold alloy, a copper silver alloy, a copper zinc alloy, a copper aluminum alloy, a copper nickel alloy, or a copper platinum alloy.

Statement 6. A conductive slurry composition according to any one of the preceding Statements, wherein the copper nanoplates further comprise iodide.

Statement 7. A conductive slurry composition according to any one of the preceding Statements, further comprising (hydroxypropyl)methyl cellulose (HPMC) (e.g., the concentration of HPMC is 0.1 to 10 weight percent, relative to the total weight of the conductive ink).

Statement 8. A conductive slurry composition according to any one of the preceding Statements, wherein the copper nanoplates are functionalized with graphene or a graphene material.

Statement 9. A conductive slurry composition according to any one of Statements 1-7, wherein the copper nanoplates are surface functionalized with one or more formate groups.

Statement 10. A conductive slurry composition according to any one of the preceding Statements, wherein the conductive slurry composition is a conductive ink (e.g., conductive ink composition).

Statement 11. A method of making a conductive slurry composition, comprising: contacting a copper salt (e.g., a copper(II) salt, or a copper (I) salt, such as, for example, copper(II) chloride or copper(II) bromide, cuprous (I) chloride), an aliphatic amine, D-glucose (or ascorbic acid), an iodide salt (e.g., sodium iodide, potassium iodide), and water to form a reaction mixture; and heating the reaction mixture to form a conductive slurry composition according to any one of Statements 1-10.

Statement 12. A method according to Statement 11, wherein the aliphatic amine has from 10 to 20 carbon atoms.

Statement 13. A method according to Statement 12, wherein the aliphatic amine is hexadecylamine (HDA).

Statement 14. A method according to any one of Statements 11-13, further comprising mixing HPMC with water (e.g., deionized water); and adding the HPMC-water mixture to the conductive ink composition.

Statement 15. A method according to any one of Statements 11-14, wherein the reaction mixture is heated for a period of time ranging from 5-48 hours, including all integer second values and ranges therebetween (e.g., 6, 9, 9.5, 10, 11, 12, and 18).

Statement 16. A method according to any one of Statements 11-15, wherein the reaction mixture is heated to a temperature from 60° C. to 140° C.

Statement 17. A method according to any one of Statements 11-16, wherein the temperature is at least 100° C.

Statement 18. A method according to any one of Statements 11-15, wherein the reaction mixture is heated to a temperature of 100° C. or less.

Statement 19. A method according to Statement 18, wherein a mixture comprising one or more formate salts (e.g., a mixture comprising ethylene glycol, water, and one or more formate salts, such as, for example, sodium formate and copper formate) is added to the conductive slurry composition and subsequently heated at 100-150° C., including all ° C. values and ranges therebetween.

Statement 20. A method according to any one of Statement 11-19, wherein the components are provided in the following amounts or in amounts based on ratios of the following amounts: 2.4 g copper(II) chloride; 3.9 g D-glucose; 14.55 g HDA; 90 mg NaI; and 900 mL water.

Statement 21. A method according to Statement 20, wherein the mixture comprising one or more formate salts comprises; 50 mL ethylene glycol and 4 mL of a solution comprising: 30 g sodium formate and 15 mg copper formate dissolved in 150 ml of water.

Statement 22. A method of printing a conductive ink, comprising: extruding a conductive ink composition according to Statement 10, and washing the extruded ink with an acid (e.g., an organic acid) to remove residual aliphatic amine.

Statement 23. A conductor printed using a conductive slurry composition according to any one of Statements 1-10.

The following examples are presented to illustrate the present disclosure. They are not intended to be limiting in any matter.

Example 1

This example provides a description the controlled growth and hybridization strategies of 2D single-crystalline copper (111)-rich nanoplates (Cu NPLs) as a building block for the development of high temperature stability, anti-oxidation and anti-corrosion conductor materials.

Described are three strategies to achieve greater stability and electric performance of copper. The first strategy involves utilizing surface passivation towards stability at moderate temperatures. The surface passivation is achieved through surface reconstruction utilizing a short ligand to prohibit adsorbates such as $O_2$ from oxidizing or corroding the surface. A short carbon chained ligand is generally preferred as longer chained ligands are insulating, but also limits the printed conductor to moderate temperatures (~300° C.) which are suitable with flexible plastics like Kapton®. The second strategy involves utilizing graphene for high temperature applications towards greater stability and enhanced current carrying capabilities (ampacity). High electric conductivity and high thermal conductivities require different properties: the former requires free electrons due to weak bonding within the system, with the latter requiring a system with strong bonds. Ampacity is dependent on electromigration, and while a non-thermal process, in most metals will result in melting as temperature increases due to joule-heating severely hindering the current carrying capabilities for practical applications. Graphene, on the other hand, are known to sustain high ampacities with high chemical and thermal stability. The integration of two dissimilar materials (graphene and Cu) can result in a high temperature conductive material that can be employed for advanced electronics with thermal management. In addition, graphene, has shown to improve oxidation-resistant performance of composite materials at high temperatures and also suppresses the copper diffusion pathways at high temperatures, thus an enhancement in its current carrying capacity. Thirdly, the nanomaterial's dimensionality (particle, sheets, wires, etc.) can affect and determine its properties. Two-dimensional (2D) materials display strong in-plane chemical bonding, along with weak out-of-plane van der Waals interactions, along with substantial planar topology (>100 nm) and very low thicknesses. The planarity of 2D copper nanostructures allows surface coordination/reconstruction, preferential layering, and larger contact area resulting in lower contact resistance. Thus utilizing the 2D architecture with the aforementioned strategies shows promise for greater thermal and oxidation stability.

Described herein is the controlled growth and hybridization strategies of 2D single-crystalline copper (111) nanoplates (Cu NPLs) as a building block for the development of high temperature stability, anti-oxidation and anti-corrosion conductor materials, with the capability of additive manufacturing onto flexible alumina ceramics (FIG. 1a). The surface coordination of formate on printed Cu conductors (Cu-FA) has the potential to introduce high oxidation and corrosion resistance without influencing its electrical conductivity (a sheet resistance of 4 mΩ/sq/mil), in addition to the increased working temperature by 100° C. compared to untreated Cu conductors. Also utilized was an in-situ copper-graphene (Cu-G) conversion, with the resulting conductors demonstrating stability at high temperatures, surviving up to 1300° C. (FIG. 1c). This improved stability and conductivity at elevated temperatures are a result from the electronic hybridization between copper and graphene interfaces, which is supported by molecular dynamic simulations and in-situ spectroscopies. Lastly, further characterizations were made to determine the purity of the Cu NPLs in addition to their stacking orientation. The demonstrated additive manufacturing process for developing conductive Cu patterns is promising for electronics applications where specific geometric patterning is required.

Results and Discussion

FIG. 1a illustrates the schematic of the fabrication process utilized for printing the Cu ink (The illustration of FIG. 1a depicts the example of in-situ conversion of dopamine to graphene in the Cu-G conductor). Also utilized was a direct-writing, extrusion printing method, for deposition of Cu-ink patterns onto various substrates, including flexible Yttria-stabilized zirconia (YSZ) substrate, Alumina Ribbon Ceramic substrate, and polymer Kapton® substrates. Multiple printing passes allow for closely-packed, dense patterns, with desirable thicknesses. After printing, the pattern was dried under ambient conditions, and was subsequently sintered allowing further densification and decomposition of the additives. FIG. 1b shows the printed pattern on an alumina ceramic plate substrate. The electrical conductivities of various Cu-based conductors. (presented here from commercial sources) and their respective operating temperatures are shown in an Ashby plot (FIG. 1c). The Cu hybridized conductors described herein were observed to have not only higher operating temperatures than most of the printable inks, but also have higher electrical conductivities. Cu-G in inert atmosphere was shown to have the highest operation temperature, even above the melting point of bulk copper. It should be noted that the only printable inks with higher electrical conductivities are comprised of noble metals.

Figure 6:
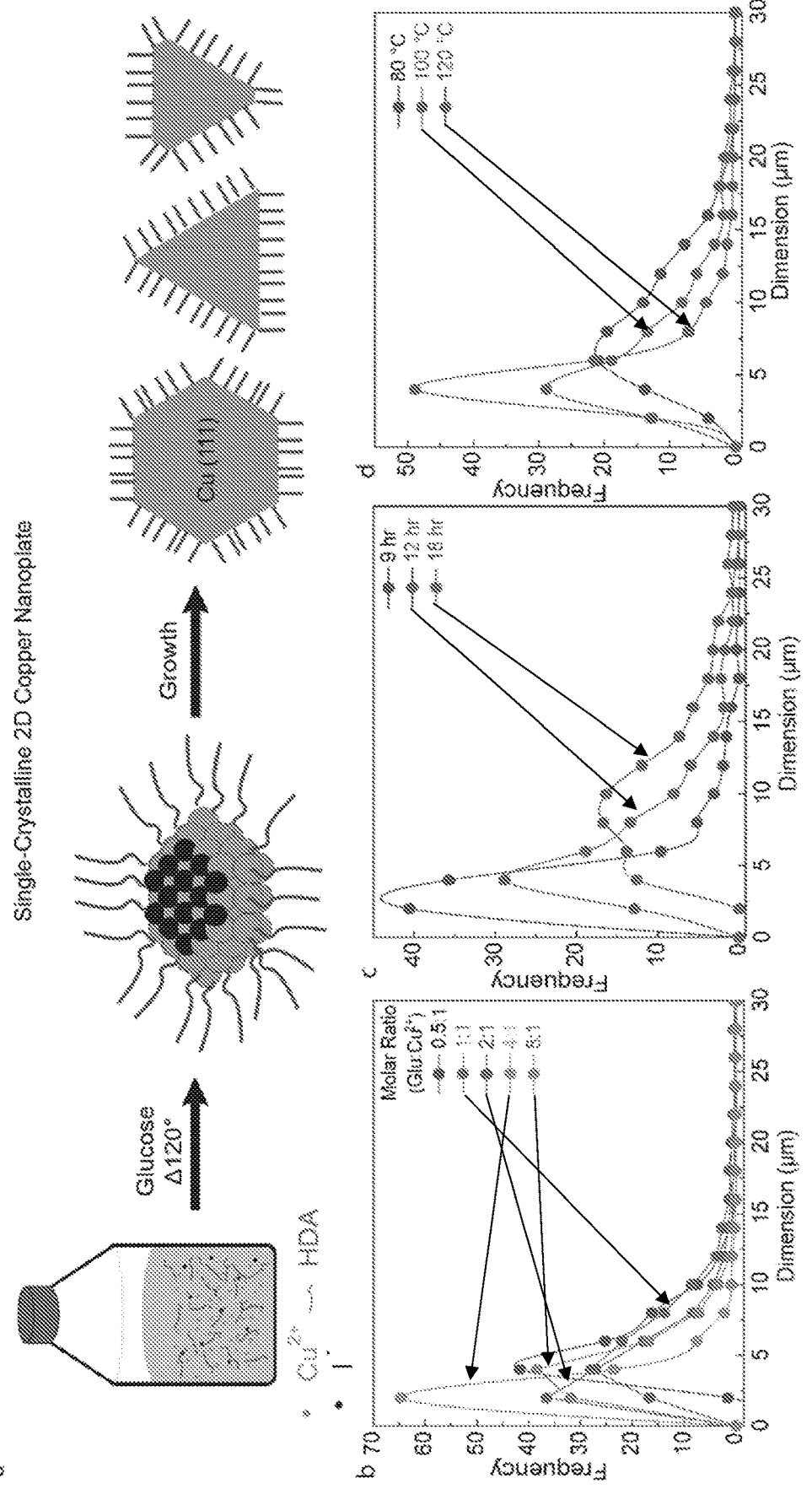
FIG. 6 shows (a) preparation, nucleation, and growth of Cu NPLs. Dimensions/shape control by varying synthetic conditions: (b) Glucose: $Cu^{2+}$ ratios, (c) reaction time, and (d) reaction temperature. If not specified, the typical reaction temperature and time is 100° C. and 12 hrs, respectively.
Figure 7:
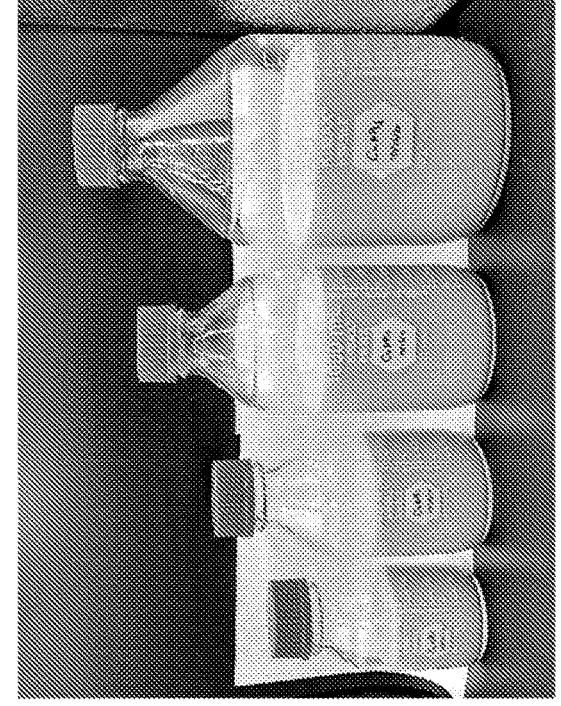
FIG. 7 shows scalability of Cu NPL production. The images show before (left) and after (right) the reaction. The table reports the values and average yield of Cu NPLs feedstock for two studies.
Figure 7:

The dimension/shape control of copper nanostructures is a fundamental component in the development of printable conductive ink material, due to material size limitations that govern different printing techniques. By utilizing the wet-chemistry synthesis, scalable controlled growth of 2D single-crystalline Cu NPLs was demonstrated through the reduction of copper chloride by glucose and subsequent adsorption of iodide on the Cu (111) plane (FIGS. 6 and 7). The scanning and transmission electron microscopy (SEM and TEM) images of as-synthesized Cu NPLs are shown in FIGS. 1*d* and 1*e*, revealing the 2D architecture of as-synthesized ultrathin Cu NPLs. The selected area electron diffraction (SAED) pattern (FIG. 1*e*, inset) for the Cu NPLs in FIG. 1*e* suggests its single-crystalline nature. In addition, the hexagonal diffraction pattern is an indication that the basal plane is the Cu {111} facet. The size distribution of synthesized Cu NPLs can be controlled by manipulating the nucleation and growth by means of tuning the reaction conditions (FIG. 6*b-d*). By increasing the glucose to $Cu^{2+}$ ratios (FIG. 6*b*), the average size of Cu NPLs can be reduced from approximately 5 μm to 3 μm as a result of increased nucleation formation. Furthermore, by increasing the reaction time (FIG. 6*c*), the average size of Cu NPLs can be increased from approximately 4 μm to 10 μm through the prolonged growth. In addition, the reaction temperature is an important parameter in the size control of Cu NPLs (FIG. 6*d*), diminishing the approximate size from 9 μm to 5 μm as the reaction temperature goes on increasing from 80° C. to 120° C. This increment in the reaction temperature results in significant increase of nucleated Cu seeds, which decreases the overall amount of Cu material for growth, thus resulting in smaller dimensions of Cu NPLs. The trends observed here can be described with the LaMer model, where increasing glucose to $Cu^{2+}$ ratio and reaction temperature results in an increased nucleation rate, resulting in more seeds and less material for seed growth, thus leading to the formation of smaller Cu NPLs. Increasing reaction time to extend the growth period, a.k.a. Ostwald ripening, allows the Cu NPLs to grow larger. Additionally, the increase in average sizes correlates to a larger size distribution of Cu NPLs.

Figure 2:
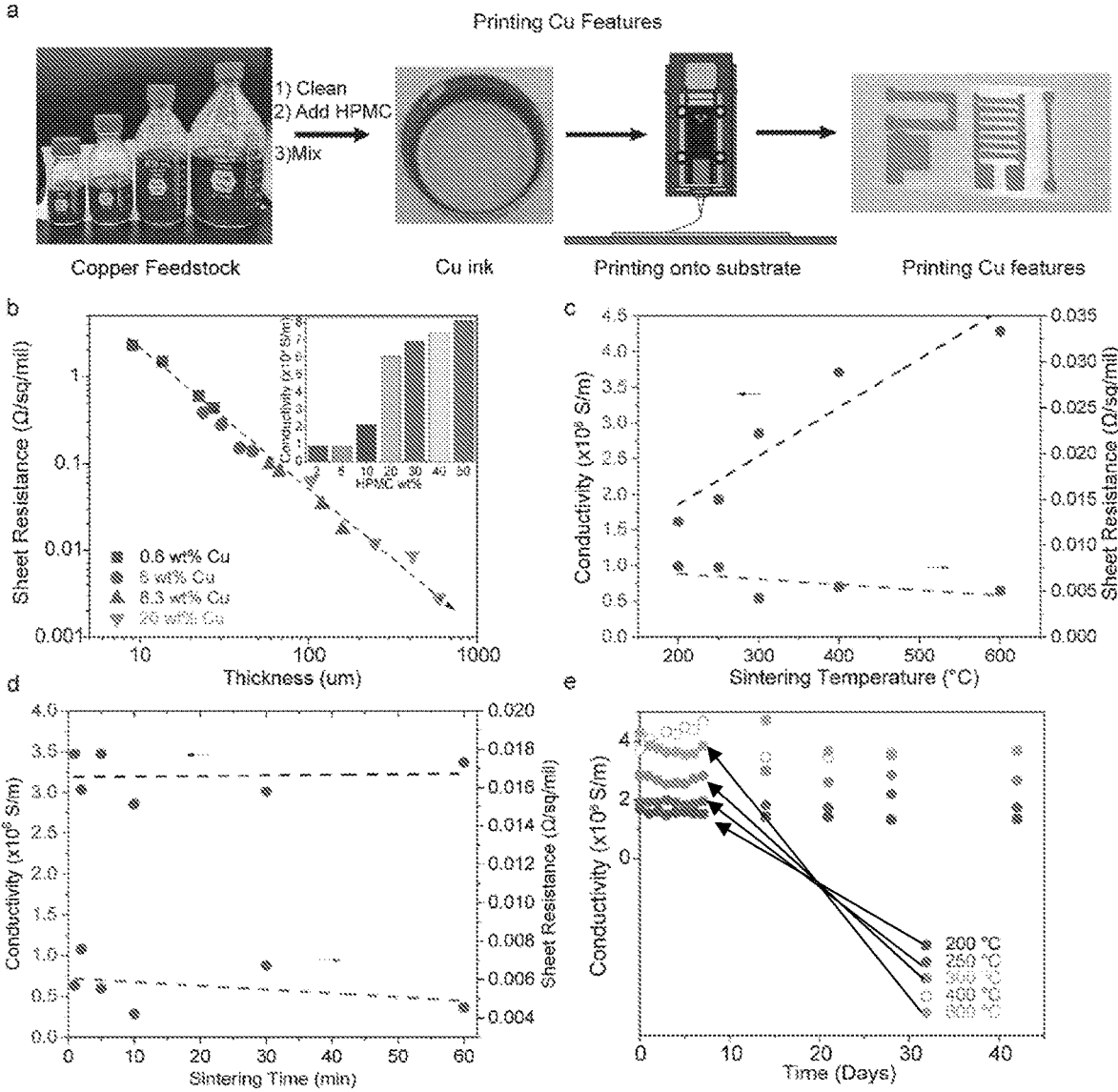
FIG. 2 shows (a) a process of printing Cu NPL features, starting from the feedstock, to Cu ink preparation, to printing, and lastly drying the printed Cu testing or sintering. (b) Sheet resistance dependence on the thickness of the conductive print. Varying thickness was dependent on number of printing passes and the Cu wt. % in the ink. The inset shows the effects of HPMC concentration on the conductivity of the prints. The conductivity and sheet resistance values of printed Cu NPL at varying sintering temperatures (c) and times (d). (e) Overtime conductivity of sintered prints over 42 days.
Figure 8:
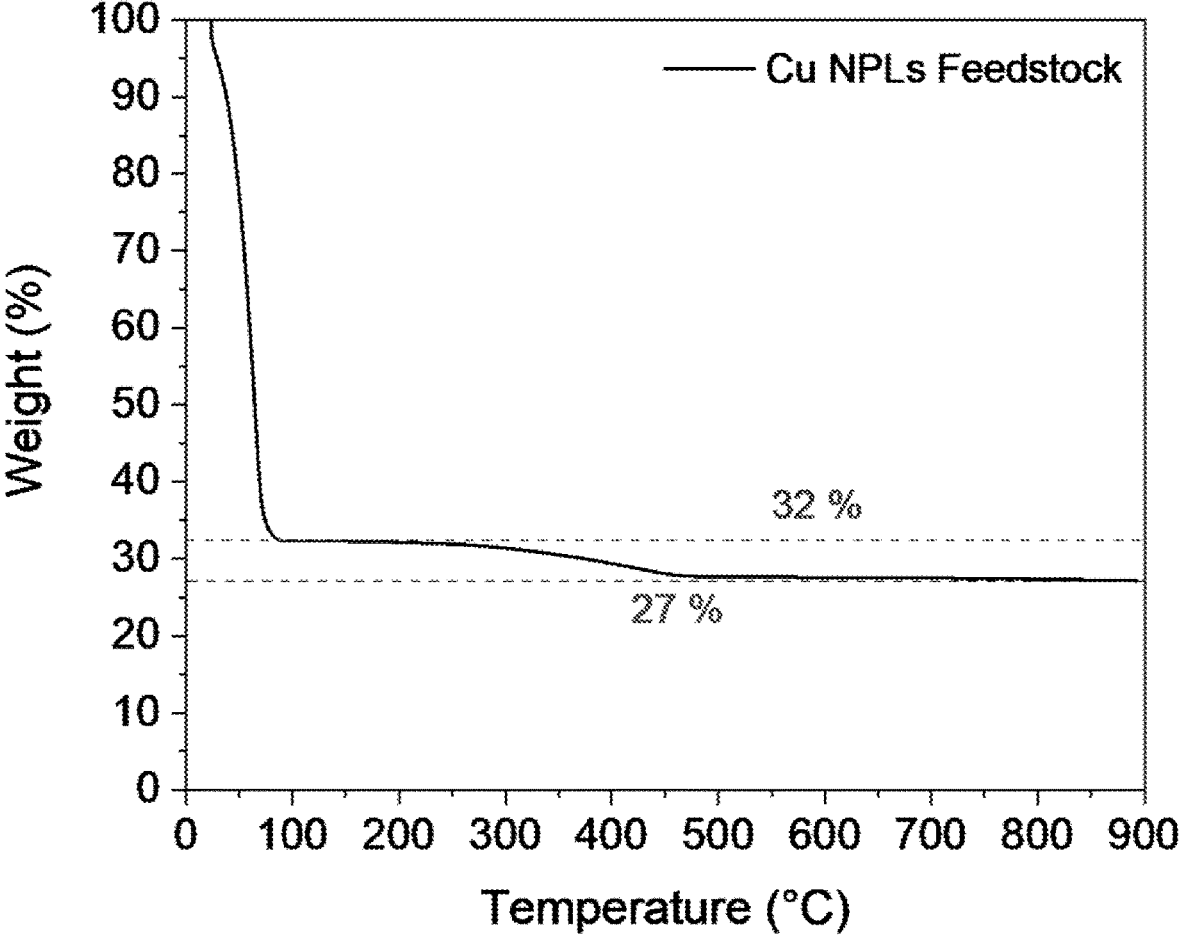
FIG. 8 shows TGA curves for Cu NPLs feedstock. By 100° C., 68% of the feedstock was lost, suggesting that water was a significant portion of the feedstock. Starting from ~300° C., 5% was lost before the weight % was stable, all the way up to 900° C. The small weight loss corresponds to the decomposition of HDA. After, only Cu was left. This result reports that Cu NPLs constitute ~27% of the weight in the feedstock.
Figure 9:
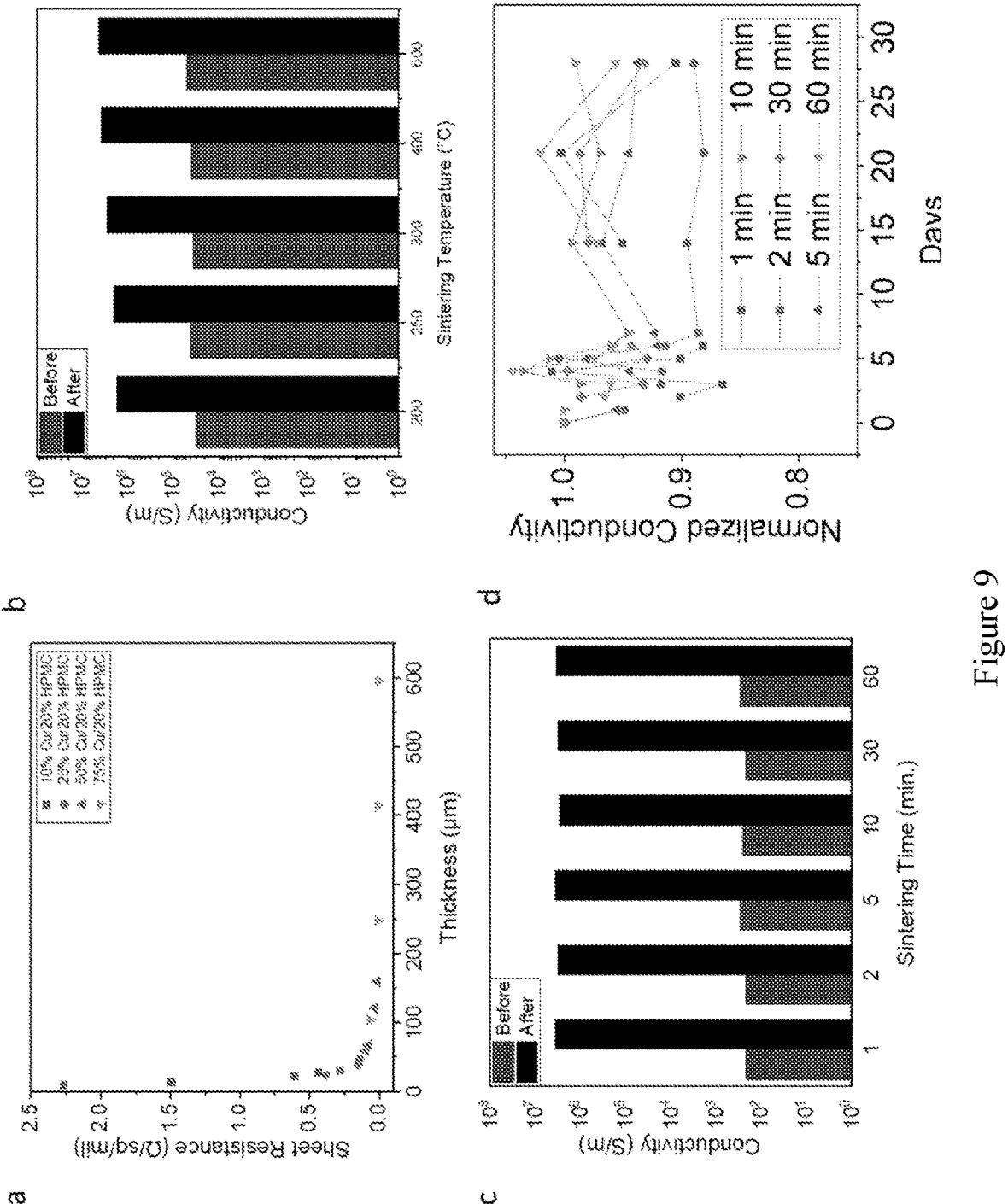
Figure 10:
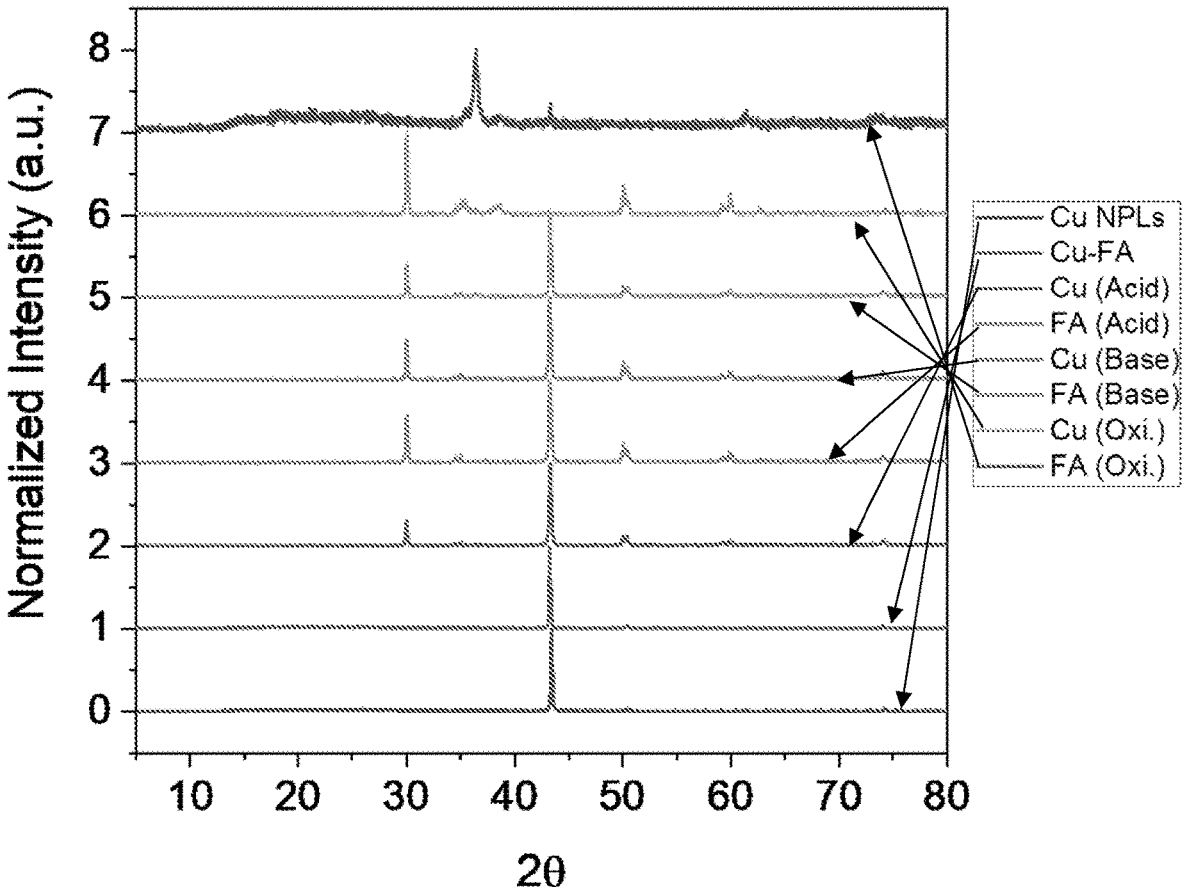
FIG. 10 shows diffractograms of Cu and Cu-FA before (bottom two) and after treatment (Acid, base, or oxidation). The diffractograms were offset for clarity. The patterns for the substrates (ceramic and Kapton) are present (~30° 2θ and below). Cu NPLs, Cu-FA, the acid tested, and base tested prints shows the (111), (200) and (220) peaks, corresponding to copper. This suggests that acid and base treatment showed corrosion after a few hours of testing. The oxidation tests showed significant change for Cu and Cu-FA. Cu (Oxi.) diffractogram suggests that $Cu^{2+}$ was significantly present, whereas Cu-FA (Oxi.) diffractogram suggests that Cult was significantly present.
Figure 11:
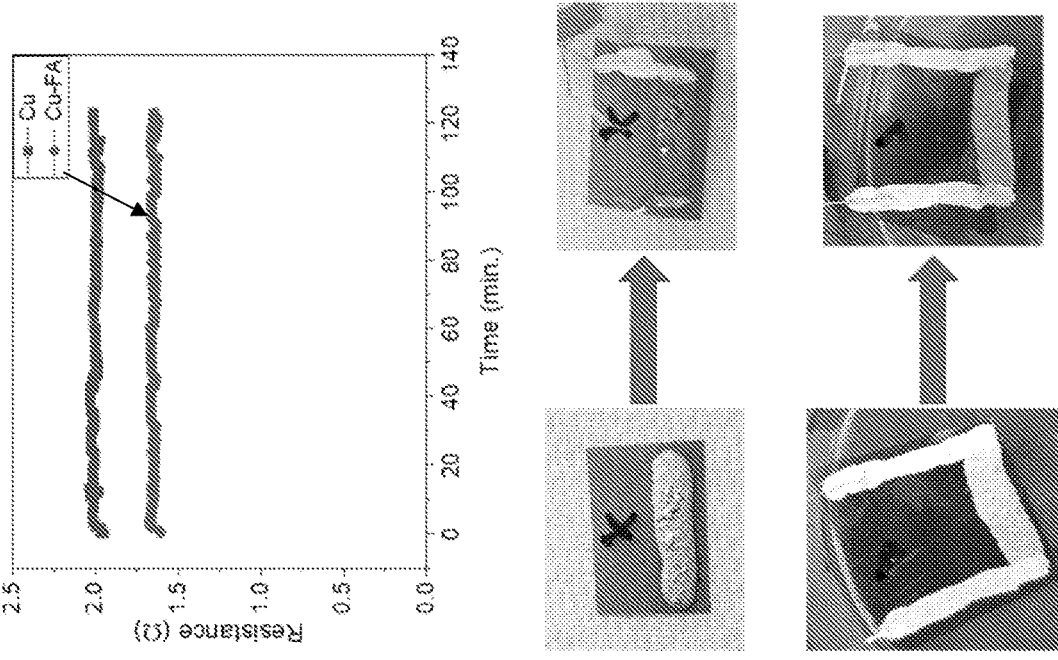
FIG. 11 shows the resistance measurement overtime is shown for Cu NPLs vs Cu-FA NPLs in acid (a), elevated humidity (b), and salt water (c) corrosion resistance testing. (d) An image of the before (left) and after (right) the salt water corrosion testing for Cu NPLs (top) and Cu-FA (bottom) NPLs. The acid test shows that the resistance of printed Cu NPLs increases slowly overtime, whereas Cu-FA is stable throughout few hours, suggesting the superior stability to acid solutions. Elevated humidity and salt water showed no change to both printed Cu and Cu-FA. Visually, however, Cu appears to have corroded significantly at the surface, but Cu-FA shows no visible corrosion.
Figure 11:
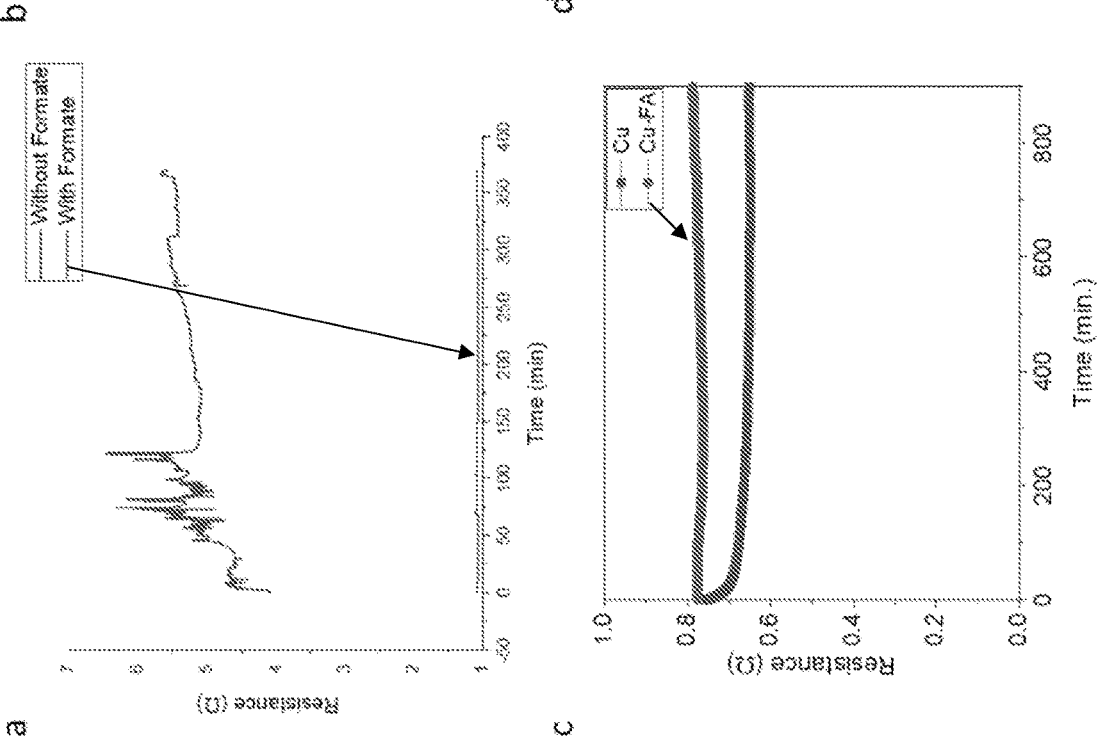

The observations above described the controlled synthesis of printable Cu material feedstocks for the development of aqueous based ink material to be printed for evaluation of its electrical conductivity (FIG. 2*a*). FIG. 2*b* shows the relationship between the sheet resistance and Cu loading concentrations of the printed features, where the increase of Cu concentration (wt. %) and the number of printing passes increases the thickness of the printed feature. Furthermore, the increase in thickness also correlates with the decrease in its sheet resistance. Ideally, a low sheet resistance could be achieved at higher Cu feedstock, however, the Cu ink's printability becomes increasingly difficult at feedstock concentrations above 6 wt. %. Additionally, on a linear scale (FIG. 9*a*) the decrease in sheet resistance becomes minor once the thickness reaches above 50 μm. Therefore, 6 wt. % Cu feedstock is selected for the following studies. In addition, the inset of FIG. 2*b* describes the electrical conductivity dependence on the hydroxypropyl methylcellulose (HPMC) additive concentration for printed Cu NPL features, for tuning viscosity and printability. The electrical conductivity increases from $1 \times 10^3$ S/m to $8 \times 10^3$ S/m, an 8-fold increase, by increasing HPMC solution content from 2 wt % to 50 wt % in the copper ink. The increased conductivity is a result of an improved adhesion and dispersibility of Cu in the preparation of the printable ink materials. The electrical conductivity improved most significantly from 10 to 20 wt. % HPMC in the printable Cu materials (from $2 \times 10^3$ S/m to $6 \times 10^3$ S/m), while any further increase in HPMC above 20 wt. % shows minor increments in the conductivity. Therefore, 20 wt % HPMC is selected for further studies. To further increase its conductivity (or decrease the sheet resistance), a sintering treatment for the printed Cu NPL patterns is believed crucial. Sintering resulted in the improvement on the conductivity/lower sheet resistance through the decomposition of non-conductive organics while annealing the Cu nanostructures for increased contact and density. By varying the sintering temperature (FIG. 2*c*) from 200 to 600° C. a clear trend is observed indicating an increased conductivity from $1.5 \times 10^6$ S/m to $4.2 \times 10^6$ S/m. In addition, the most significant increase of electrical conductivity occurs at the sintering temperature from 250 to 300° C. The boiling point of one of the additives, hexadecylamine (HDA), is around 330° C. (FIG. 8), which suggested that the increase conductivity at 300° C. is correlated to the removal of HDA in the printed Cu NPL features. The trend for sheet resistance of printed Cu NPL features is similar, a decrease from lower to higher sintering temperatures. However, there is no significant difference in sheet resistance when sintering from 300 to 600° C. and thus 300° C. is chosen as the sintering temperature. When investigating the effects of sintering time from 1 to 60 minutes (FIG. 2*d*) at 300° C. no trend is observed and that electrical conductivities varied from $3 \times 10^6$ S/m to $3.5 \times 10^6$ S/m. In addition, the stability of the printed copper features in ambient conditions (FIG. 2*e*) is measured over a duration of 42 days. The printed Cu patterns show little to no change in its conductivity over that timespan demonstrating high stability in ambient conditions.

Figure 3:
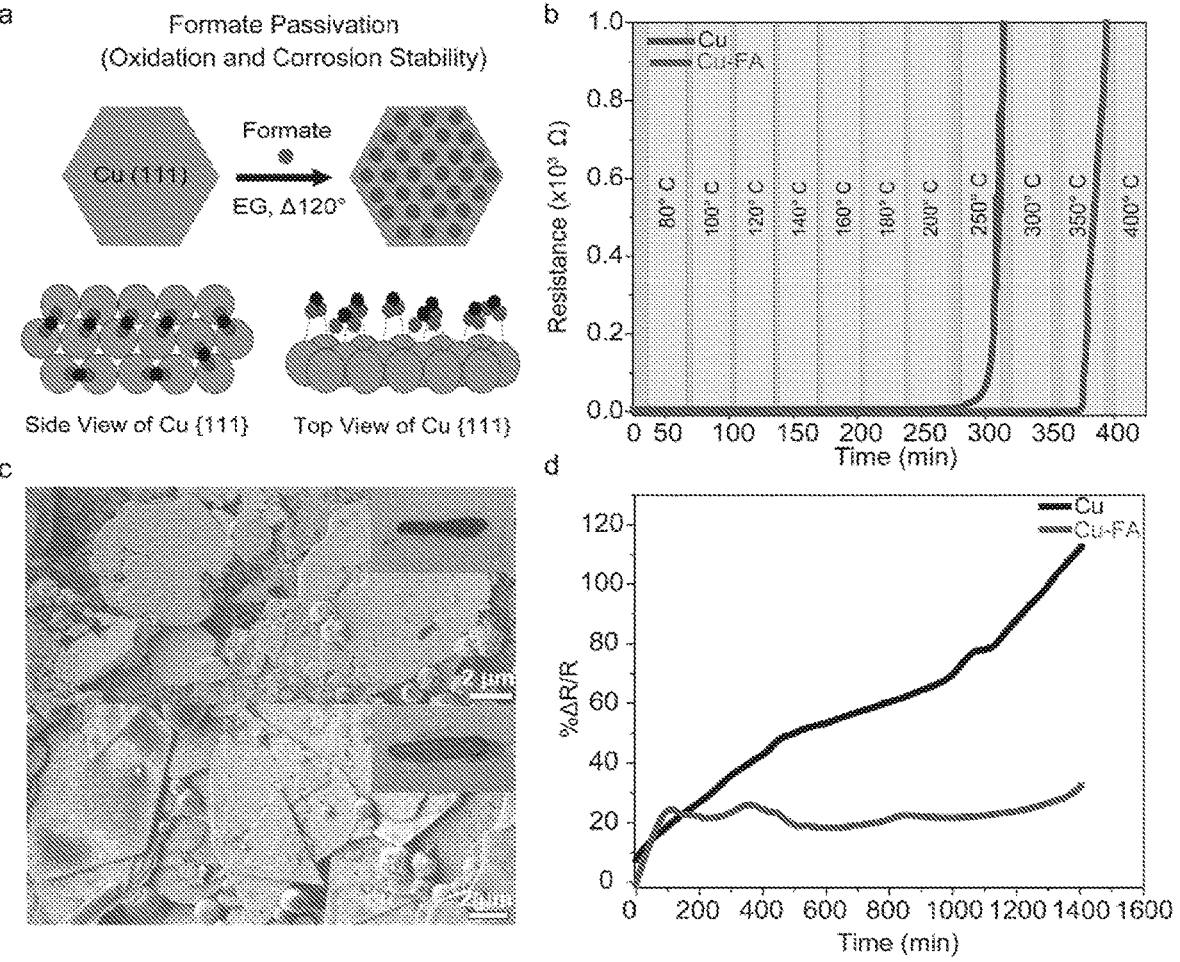
FIG. 3 shows (a) hybridizing strategy: Formate passivation of the Cu {111} facet. A model of Cu NPLs with formate molecules passivating the surface. (b) Oxidation resistance study of bare Cu NPLs vs Cu NPLs-FA at increasing temperatures. The red boxes represent the temperature ramping up at 5° C./min. The green boxes represent the holding temperature specified for 30 minutes. (c) The SEM images (left) of Cu NPLs (top) and Cu NPLs-FA (bottom) after base corrosion testing. The insets are images of the Cu prints after. The resistance change (d) of the Cu prints during prolonged submersion in 0.1M NaOH solution.

Copper nanostructures' lower resistance to oxidation and corrosion are due to its high surface-to-volume ratio, compared to bulk. Improving its anti-oxidation and anti-corrosion is vital in prolonging the lifetime and electrical performance of printed Cu NPL features. Further described is a surface hybridization strategy where formates (FA) were introduced onto the printed single-crystalline Cu (111) NPLs (FIG. 3*a*). The surface passivation occurs with FA binding to neighboring copper atoms at the surface. Through this Cu-FA hybridization, the enhancement in oxidation resistance of Cu conductors was demonstrated. FIG. 3*b* compares the oxidation resistance between Cu NPL and Cu-FA under ambient conditions at increased temperatures. Both conductors survive oxidation at 200° C. however Cu conductor started oxidizing significantly at 250° C. The Cu-FA conductor, on the other hand, oxidized at 350° C. an increased working temperature of about 100° C. compatible with the maximum working temperature of flexible polymer substrates, like Kapton®. The increased oxidation resistance of Cu-FA can be attributed to the surface formate layer preventing oxygen from oxidizing the Cu surface. At 350° C. however, the surface formate layer decomposes, exposing and subsequently allowing oxygen on the conductor surface. In addition to the enhanced oxidation resistance, the Cu-FA hybridization also enhances the corrosion resistance. The SEM images (FIG. 3*c*) are shown of Cu (top) and Cu-FA (bottom) after prolonged base treatment, in which a pronounced corrosion and surface reconstruction can be observed on the Cu conductor. On the other hand. Cu-FA conductors retain their distinct shapes with little to no visible damage of the printed structure. The insets for each SEM image (FIG. 3*c*) correspond to the image after the base treatment. The measured resistances under base corrosion measurement (FIG. 3*d*) of Cu and Cu-FA reveal the anti-corrosion nature for Cu-FA with no significant resistance change. Cu-FA shows an increasing trend for the first 100 minutes, however, the resistance plateaus and remained steady. Cu, however, showed a steady increase in resistance overtime. These observations suggested the enhanced anti-oxidation and anti-corrosion performance of surface hybridized Cu conductor through the formate passivation.

Figure 12:
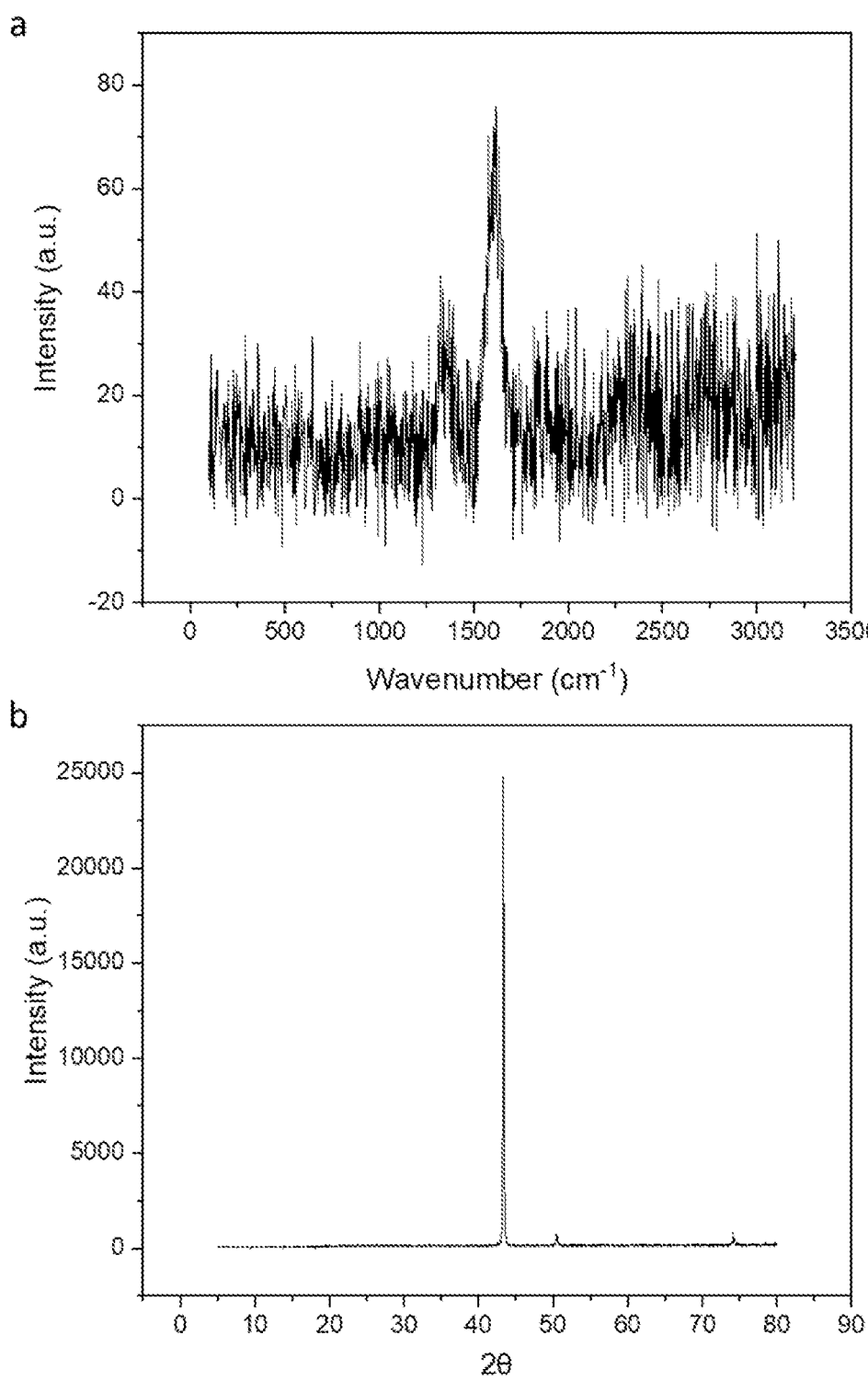
FIG. 12 shows a (a) Raman spectrum and (b) XRD diffractogram for Cu-G after heating at 1300° C.

In addition to the enhanced resistance to oxidative and corrosive environments, an in-situ direct conversion of molecular dopamine and hybridization strategy of Cu-graphene conductors focusing on extreme environments such as high temperatures, where the temperatures greatly exceed 1084° C. (bulk copper's melting point), was introduced. The in-situ Cu-G direct conversion is achieved through dopamine coating during the Cu ink preparation, which when carbonized at elevated temperatures, serve as a potential graphene source. This can be attributed to the presence of hydroxyl (—OH) and amine (—NH$_2$) groups forming an uniform coating on the Cu nanoplate surface, which in turn attributed to their strong adhesion due to non-covalent bonds (hydrogen bonding or %π-π% stacking), resulting in the enhancement of electrical conductivity due to metallic and covalent bond formation between the graphene and copper (111) nanoplates. When this nanoplate-polydopamine (PDA) mixture is sintered at a temperature of 800° C. where in-situ conversion of PDA happens, leading to the formation of Cu (111)-G conductor with high conductivity ($4.3 \times 10^6$ S/m). The in-situ conversion approach is indicative of a better overall performance and reliability, which can be attributed to a high-quality interface between the Cu (111) surface and the in-situ polymerized graphene (the graphene formation is confirmed by Raman spectroscopy shown in FIG. 12$a$, and the following spectroscopy studies). A model depicting how the graphene layer preferentially adsorbs onto the Cu {111} facet (FIG. 4$a$), effectively passivating and hybridizing the Cu conductor. The adjoined images (FIG. 4$a$, inset) show the printed Cu-G feature before (top) and after (bottom) sintering, showing no sign of melting after sintering up to 1400° C. significantly above bulk copper's melting point.

Figure 4:
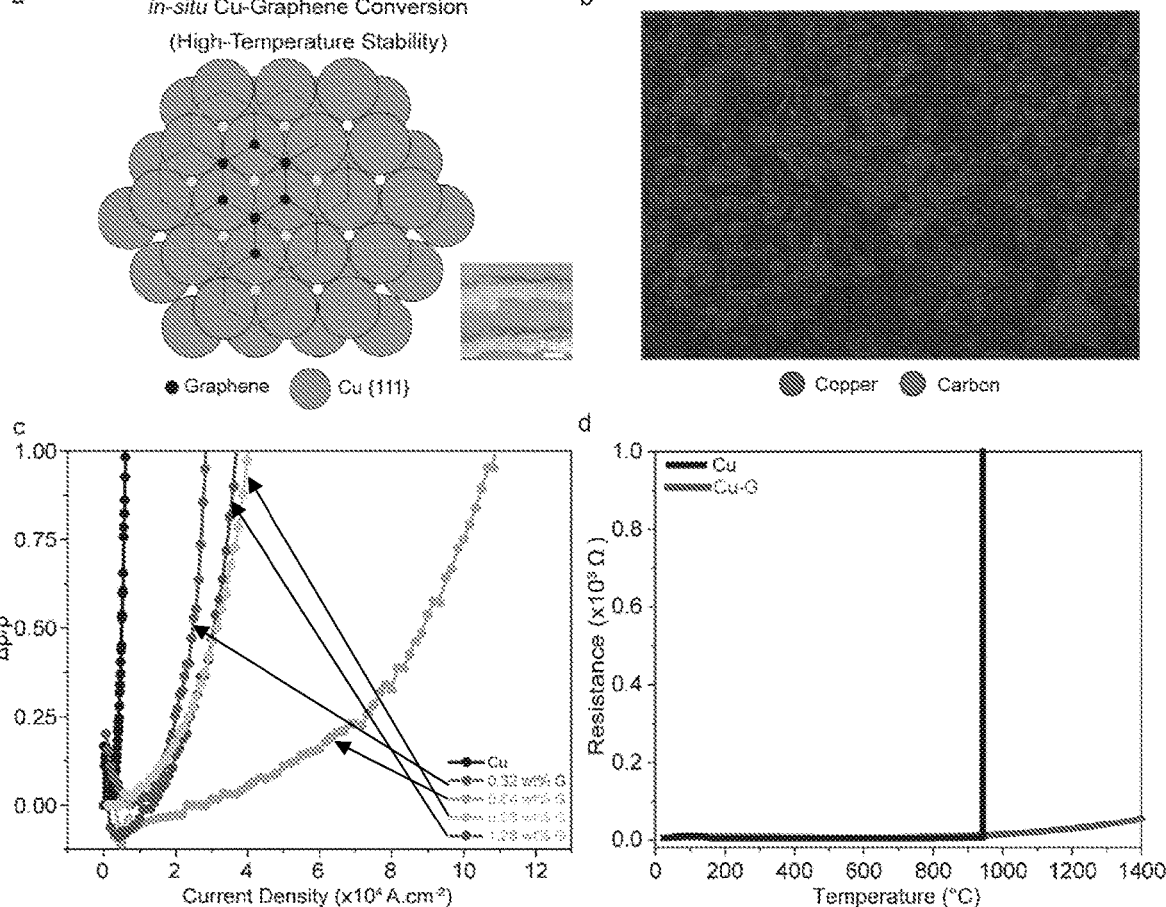
FIG. 4 shows (a) hybridizing strategy: Graphene formation onto Cu {111} facet. A model of how graphene stacks on top of the Cu {111} facet after heating at 1300° C. The inset image shows the Cu prints before (top) and after (bottom) sintering at 1300° C. (b) An SEM image of Cu-G NPLs after surviving up to 1300° C. (c) Ampacity measurements for pure Cu NPLs and Cu-G at various dopamine concentrations (0.32-1.28 wt. % G) (d) Resistance change measurement at increasing temperatures of Cu NPLs and Cu-G NPLs.

A SEM and energy-dispersive X-ray spectroscopy image (FIG. 4$b$) shows the printed Cu-G feature after sintering, revealing the uniform distribution of Cu and C elements. X-ray diffraction (XRD) is used (FIG. S7$b$) to characterize the Cu-G conductors after heating up to 1400° C. The three peaks observed at 20 values at 43.3°, 50.5°, and 74.1° are characteristic for Cu (FCC), corresponding to {111}, {200} and {220} planes, respectively. The intense peak related to the Cu {111} lattice plane suggests that the Cu (111) are maintained, further suggesting that the printed Cu-G conductors have survived after sintering at 1400° C. FIG. 4$c$ shows the ampacity measurements between pure Cu NPLs and Cu-G conductors. Varying dopamine concentrations reveals an increase in ampacity from pure Cu NPLs to 0.64 wt. % G followed by a decrease in ampacity at 0.96 and 1.28 wt. % G, suggesting that 0.64 wt. % G is the optimal concentration. Cu-G (0.64 wt. %), when compared to pure Cu NPLs, shows an increase of approximately 20-fold (approximately from $0.5 \times 10^4$ to $10 \times 10^4$ A·cm$^{-2}$) in current-carrying capacity, which assists in concluding that electric and thermal conductivity of Cu-G conductor is remarkably higher compared to Cu NPLs, which further accentuates the role of graphene on high temperature stability and thus reliability. In addition, high-temperature conductivity studies (FIG. 4$d$) are performed comparing the printed Cu NPLs and Cu-G features sintered under an inert atmosphere up to 1400° C. whereas printed Cu NPLs failed around 950° C. Both of the enhanced performances observed can be attributed to graphene's role in suppressing Cu diffusion and its high thermal conductivity, and hybridizing Cu and graphene at interface during in-situ conversion. These observations demonstrates graphene's ability to significantly suppresses Cu diffusion through preferential lattice matching, while its high thermal conductivity and hybridization reduces the likelihood of the Cu melting.

Figure 5:
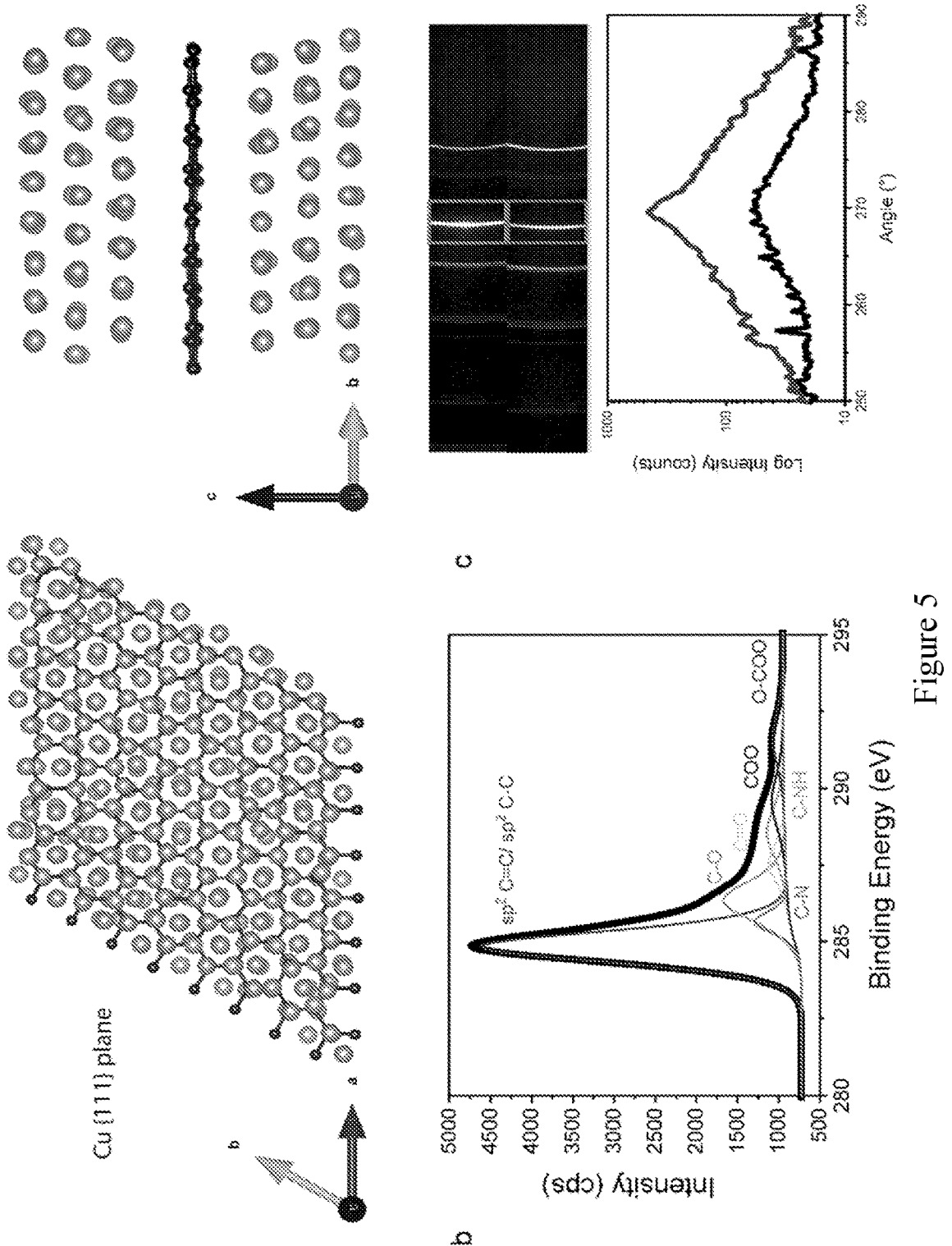
FIG. 5 shows (a) a molecular dynamics simulations of a copper-graphene-copper heterogeneous structure at 1,600K at a top-down (left) and side view (right). (b) The XPS spectrum of sintered Cu-G at the carbon core (C 1s) region. The region has been deconvolved into several peaks depicting different chemical environments, with residuals suggesting a good fit. (c) The 2D XRD scans (top) and the corresponding XRD crystal tilt orientation study at 2θ value of 43.3° (showing sintered and unsintered) The graph (bottom) shows the average crystal tilt of unsintered (bottom line) and sintered (top line) Cu-G prints.
Figure 13:
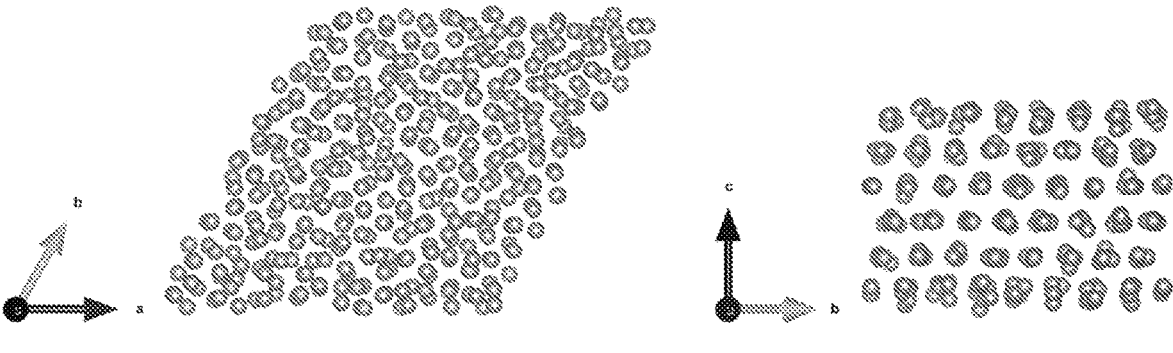
FIG. 13 shows molecular dynamics of pristine Cu at 1600K.
Figure 14:
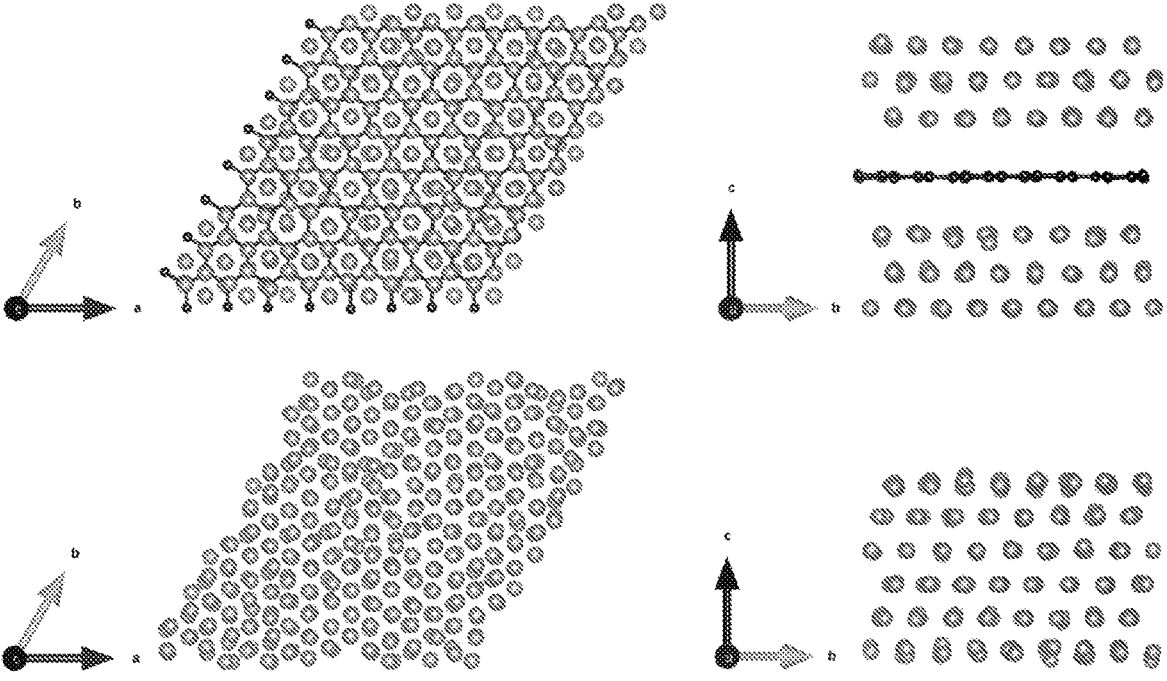
FIG. 14 shows molecular dynamics of Cu-G-Cu (Top) and pristine Cu (Bottom) at 800K.
Figure 15:
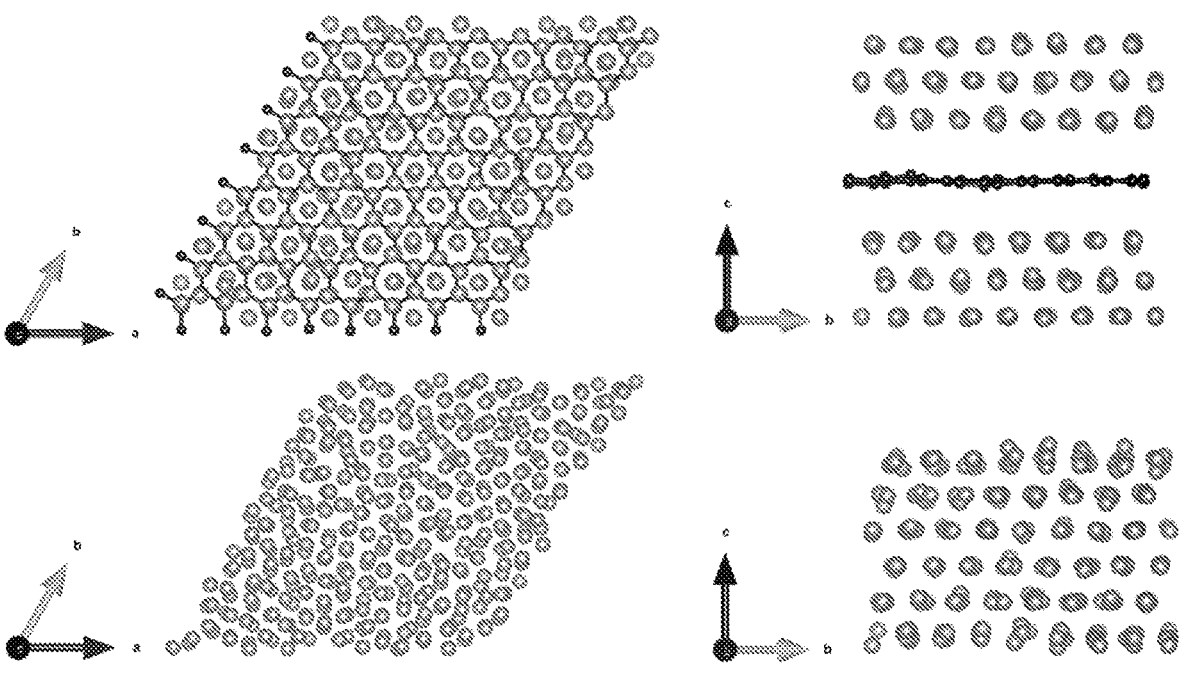
FIG. 15 shows molecular dynamics of Cu-G-Cu (Top) and pristine Cu (Bottom) at 1200K.
Figure 16:
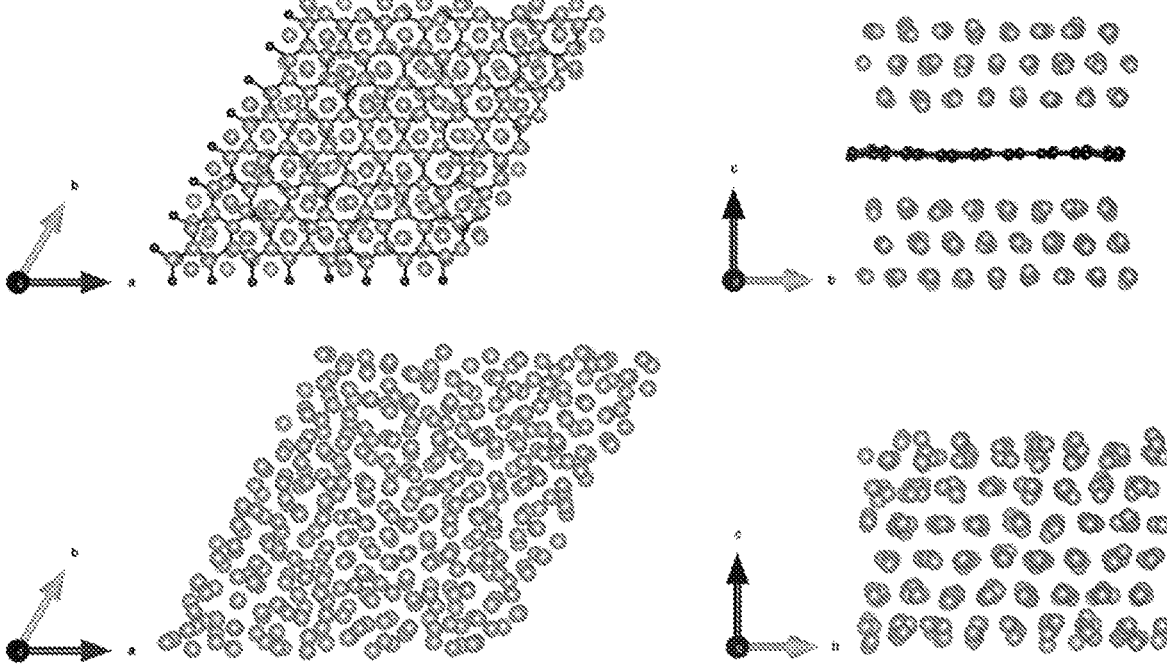
FIG. 16 shows molecular dynamics of Cu-G-Cu (Top) and pristine Cu (Bottom) at 2000K.

To understand the effects of graphene incorporation in copper on their bonding behavior of alloy systems, we performed molecular dynamic simulations for a pristine copper system including 6 atomic layers along [001] direction and a copper-graphene-copper heterogenous structure with temperatures at 800 K (FIG. 14). 1200 K (FIG. S10). 1600K (sintered. FIG. 5$a$: unsintered. FIG. 13), and 2000 K (FIG. 16). Large atomic displacements of copper atoms were observed away from their equilibrium positions in pristine 6-layer copper slab appear at around 1200 K and are enhanced when the temperature is increased up to 2000 K. On the other hand, copper atoms in the copper-graphene-copper heterogeneous structure exhibit much less deviations from their equilibrium positions. The results provide a strong evidence that the incorporation of graphene is able to enhance the bonding stability of the whole structure at higher temperature, and hence increase the melting point of the system.

Figure 17:
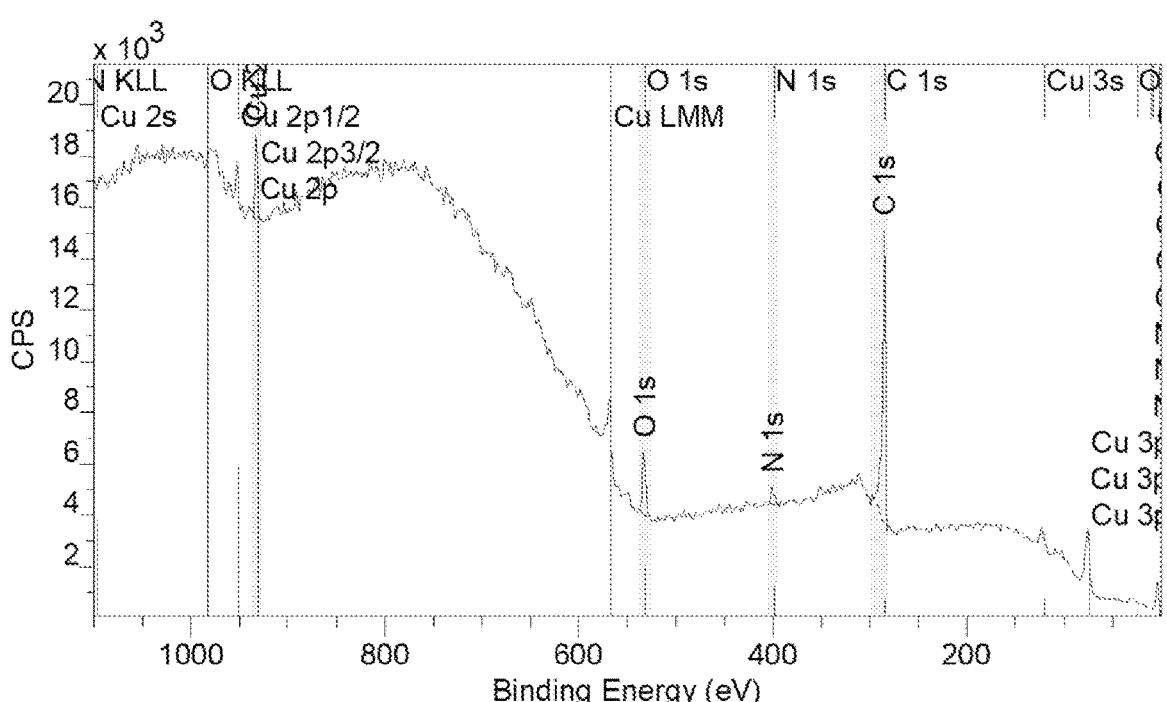
FIG. 17 shows HR XPS survey scans of sintered (top) and unsintered (bottom) Cu-G conductors.
Figure 17:
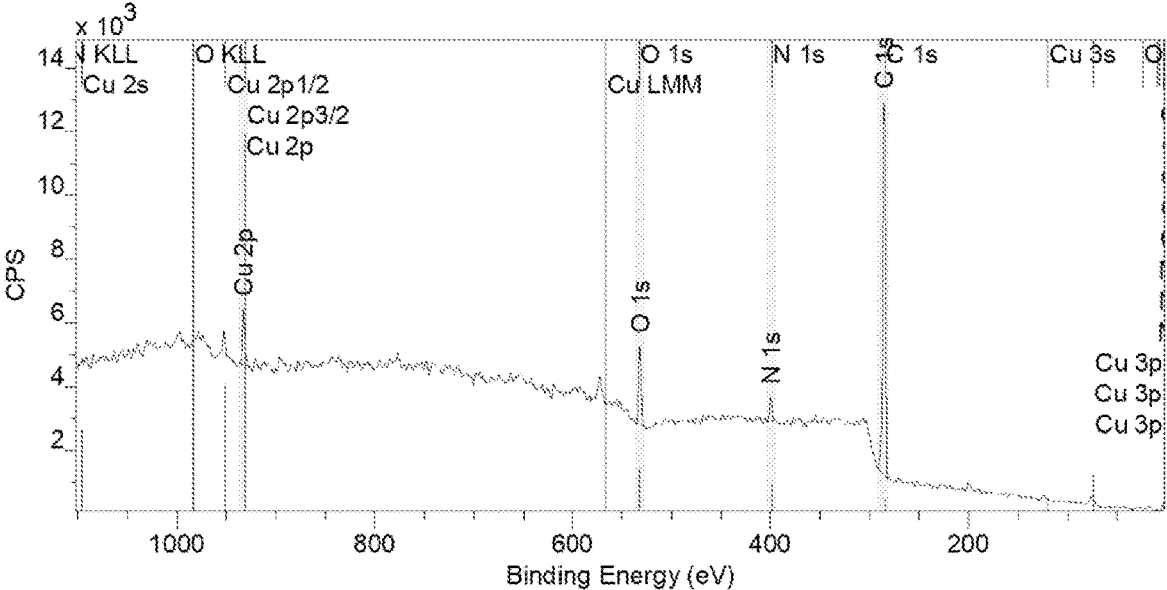
Figure 18:
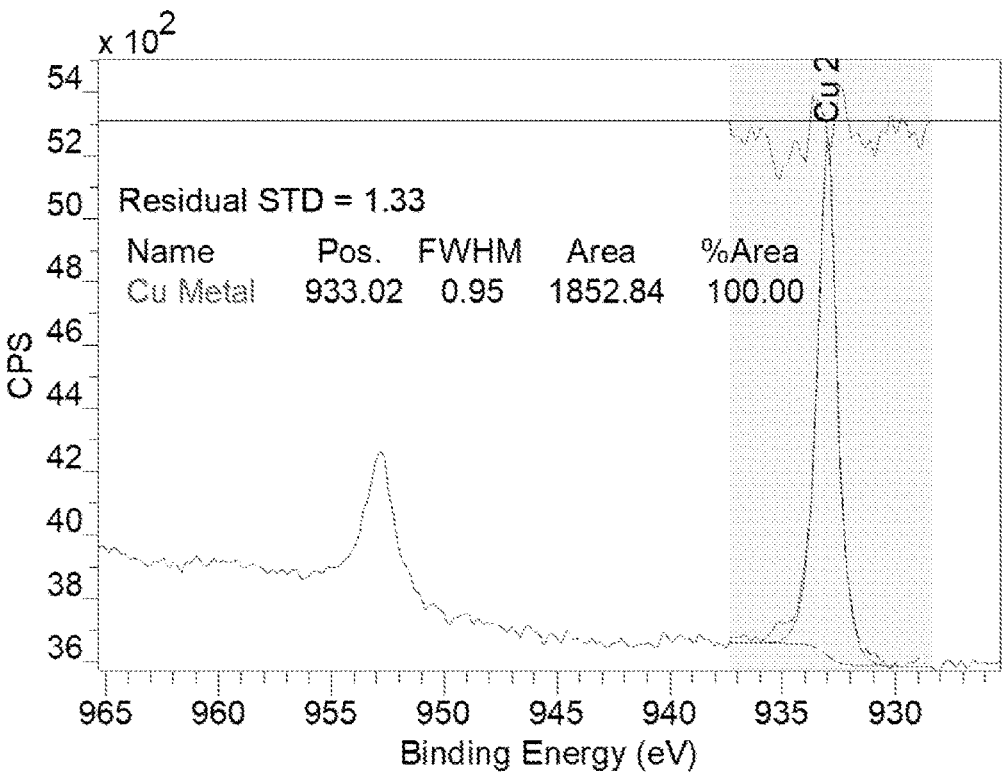
FIG. 18 shows Cu 2p XPS spectra of sintered (top) and unsintered (bottom) Cu-G conductors.
Figure 18:
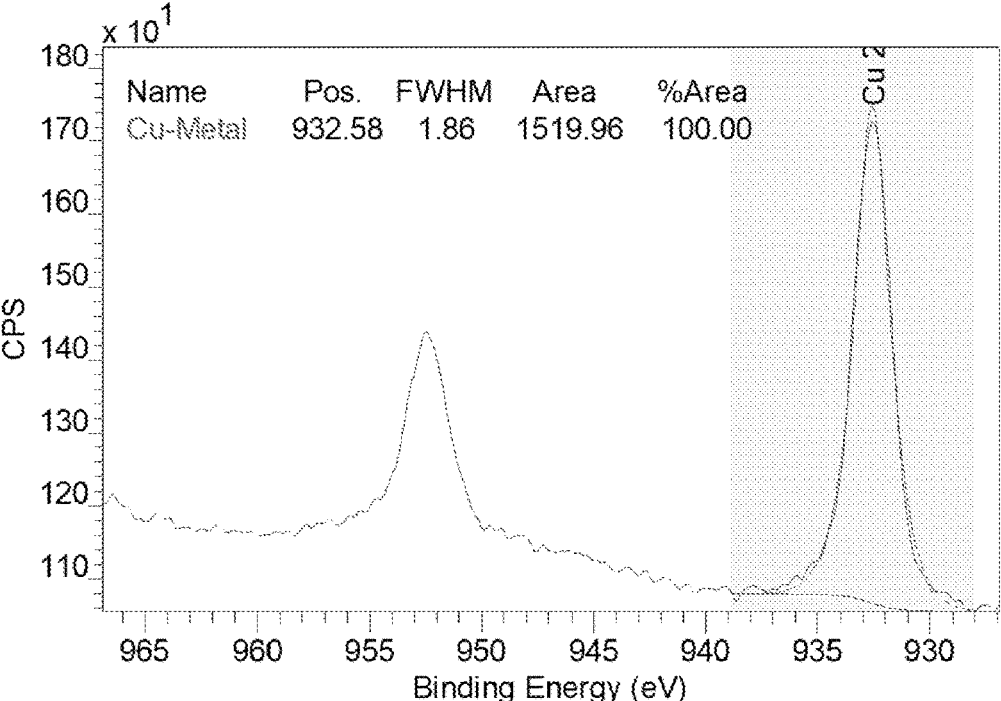
Figure 19:
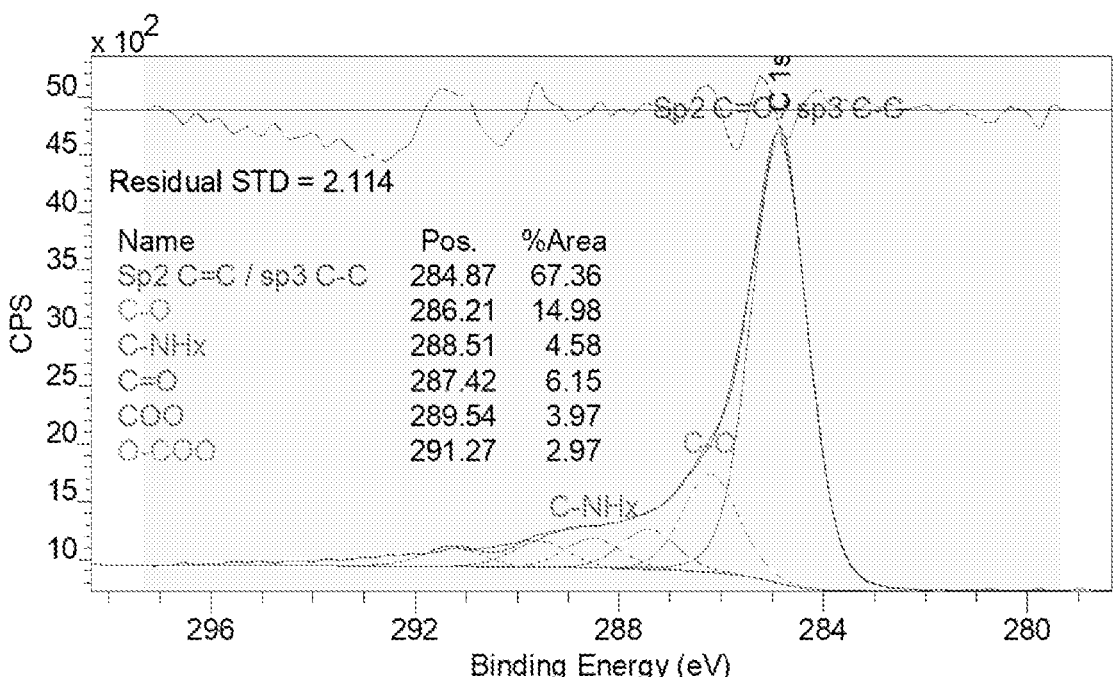
FIG. 19 shows C 1s XPS spectrum of sintered (top) and unsintered (bottom) Cu-G conductor.
Figure 19:
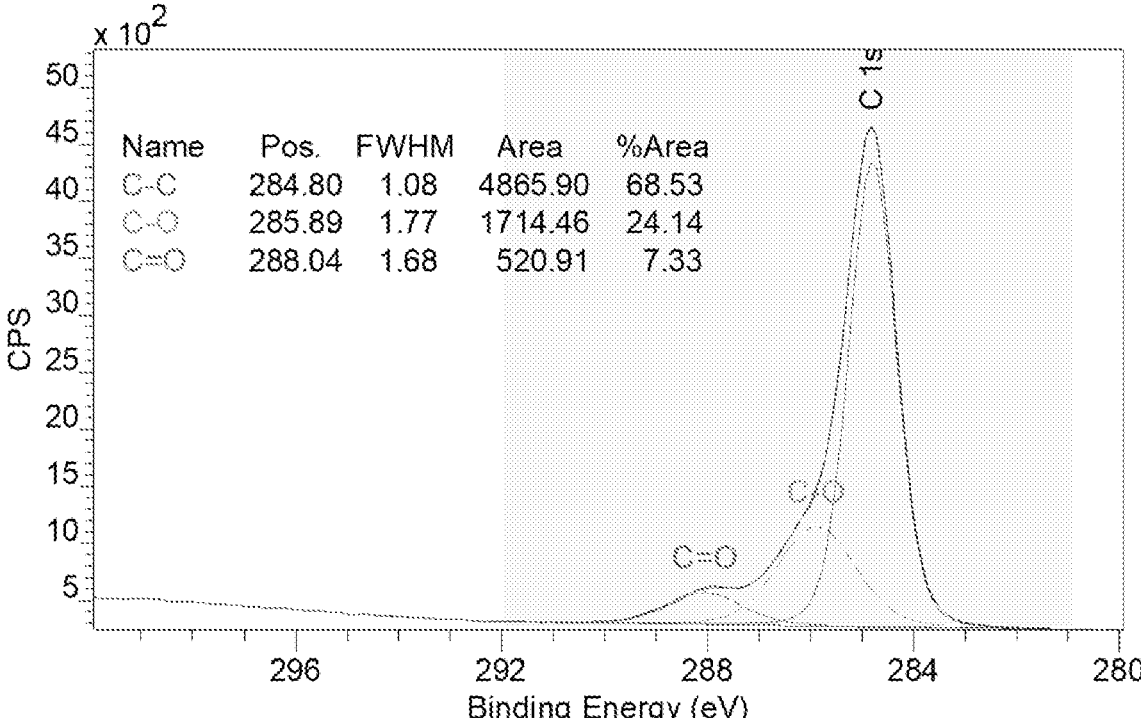
Figure 20:
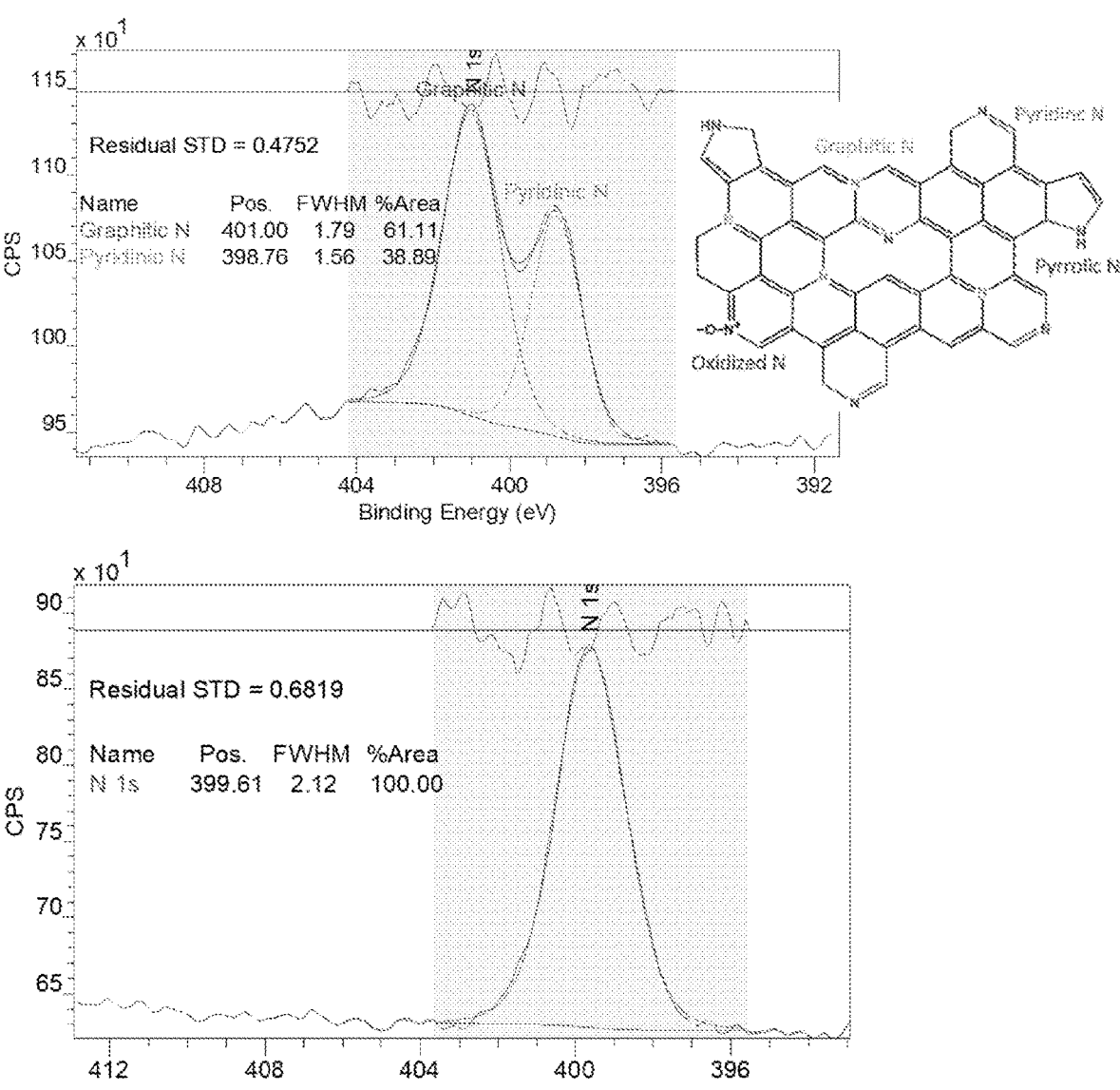
FIG. 20 shows N 1s XPS spectra of sintered (top) and unsintered (bottom) Cu-G conductors. The molecule displays the nitrogen-doped graphene and highlights the chemical environments for graphitic, pyridinic, pyrrolic, and oxidized N.
Figure 21:
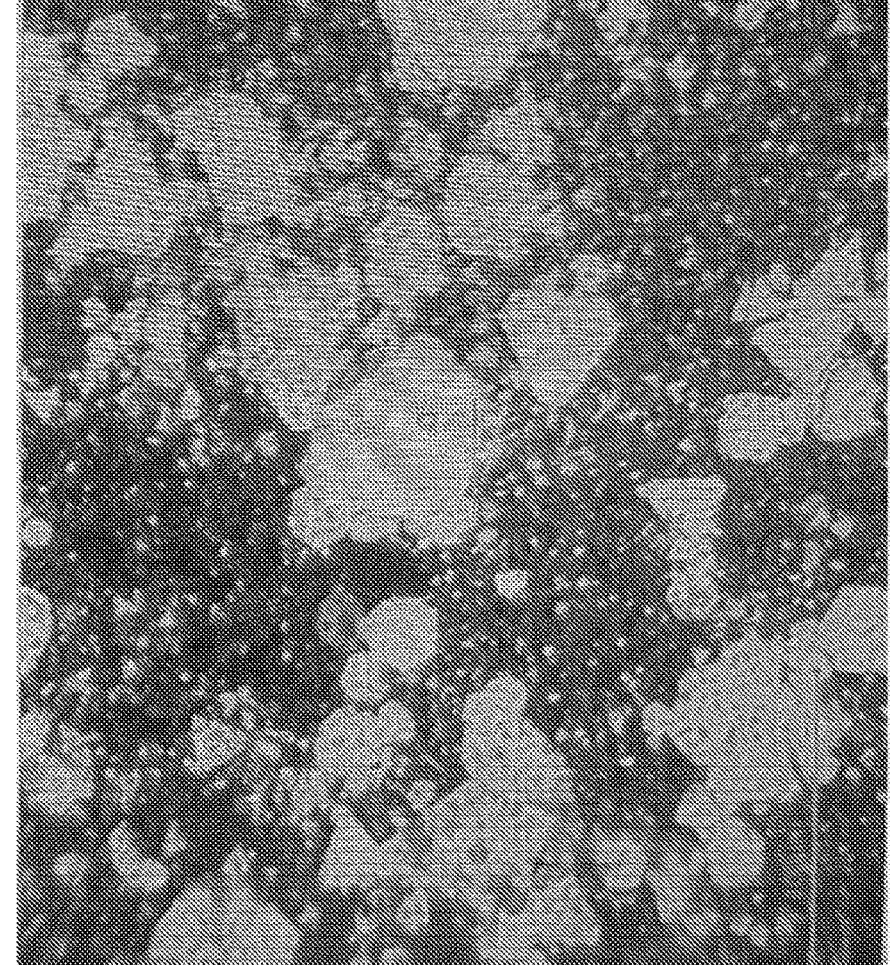
FIG. 21 shows a TEM image and SAED pattern (left) and an optical microscope image (right) of Cu NPLs.
Figure 21:
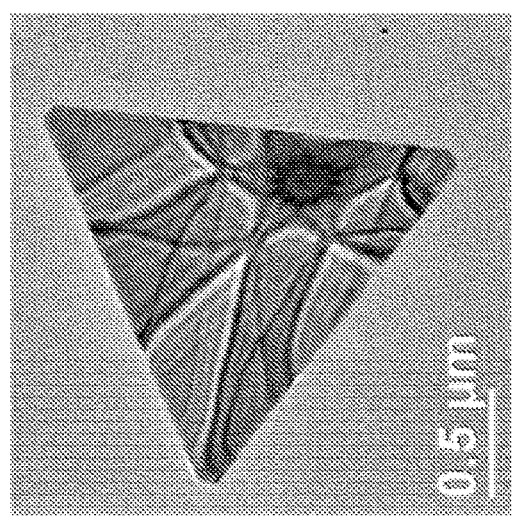
Figure 21:
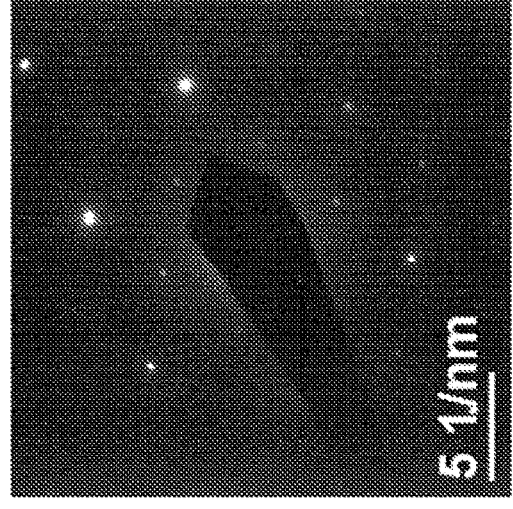
Figure 22:
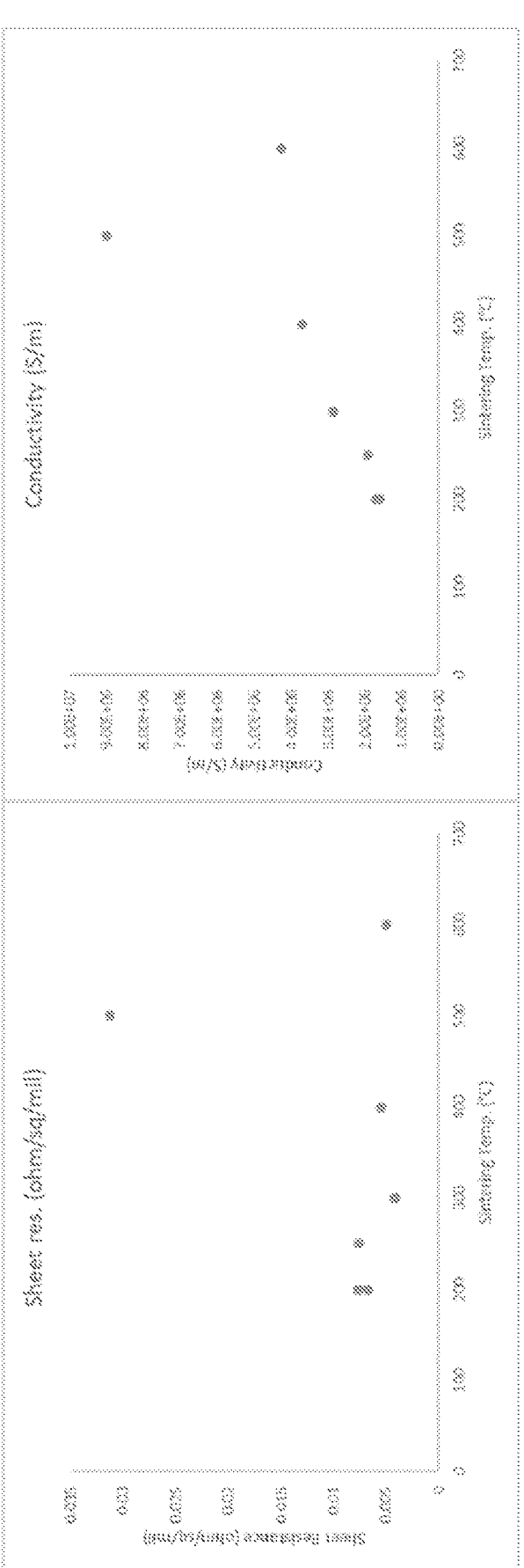
FIG. 22 shows sheet resistance (left) and conductivity (right) of Cu conductors at various sintering temperatures for 10 minutes.
Figure 23:
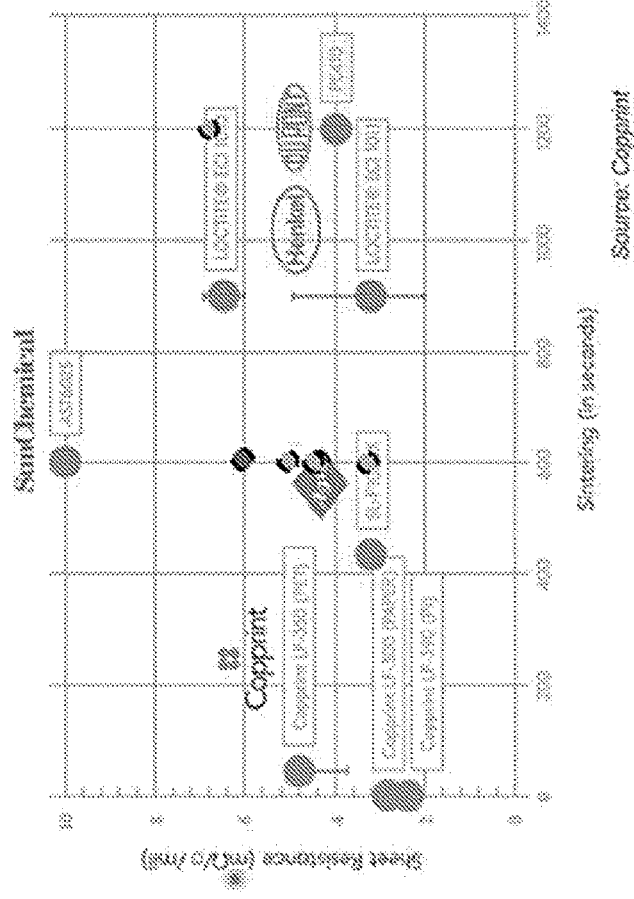
FIG. 23 shows (Left) stability of Cu conductors after sintering at various temperatures. (Right) Comparison between our Cu conductors vs others. The figure is provided by Copprint.
Figure 23:
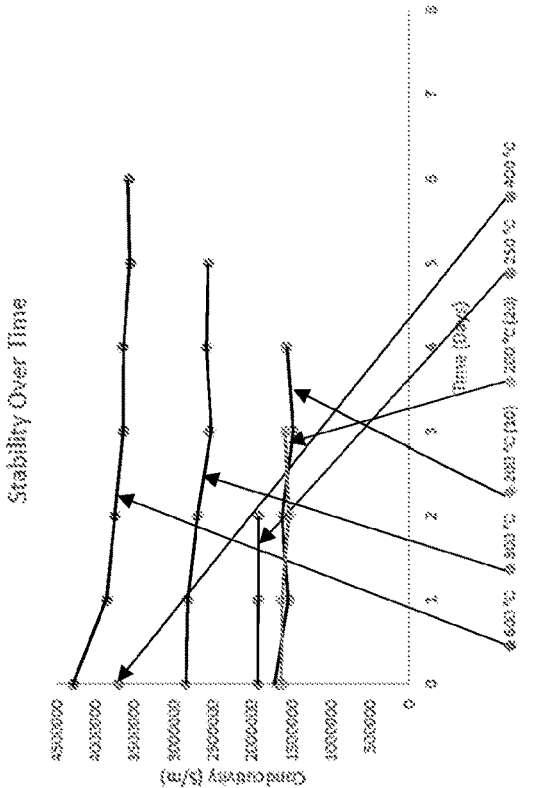
Figure 24:
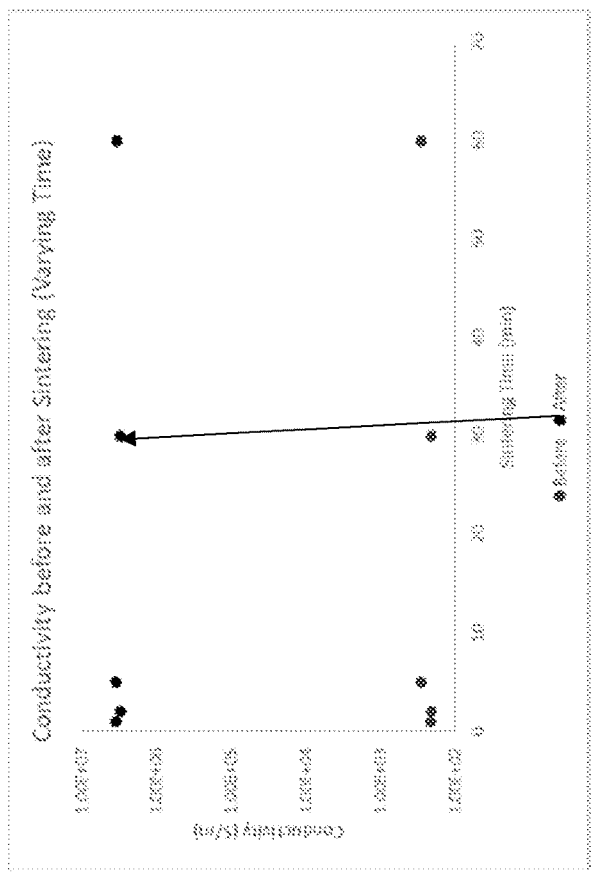
FIG. 24 shows conductivity of Cu conductors at various sintering temperatures for 10 min. (left) and sintering time at 300° C. (right).
Figure 24:
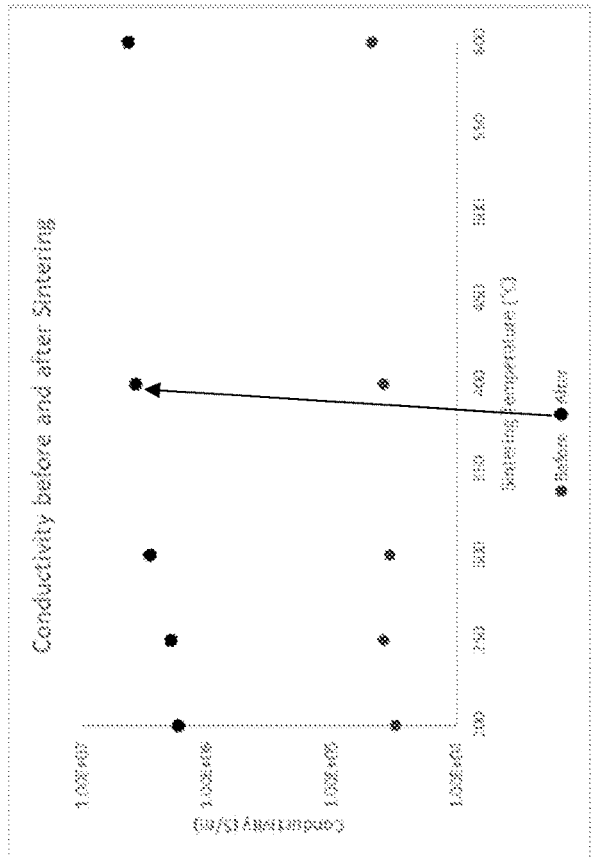
Figure 25:
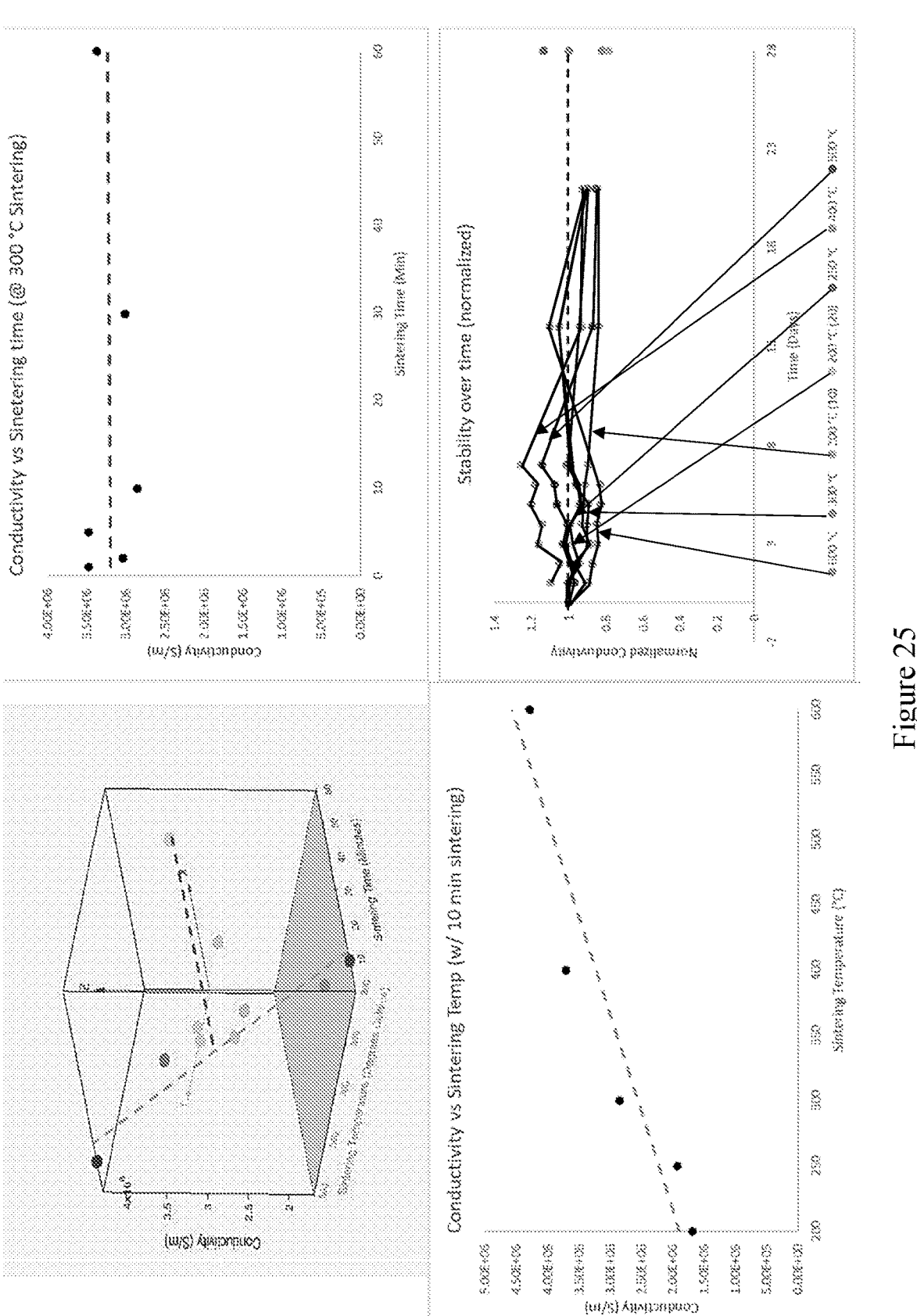
FIG. 25 shows the 3-D graph (top-left) combines the conductivity as a function of sintering time at 300° C. (top-right) and sintering temperature for 10 min (bottom-left). (Bottom-right) Normalized conductivity to show relative stability of Cu conductors sintered at temperatures over 28 days.
Figure 26:
FIG. 26 shows printability of Cu NPL inks on various substrates.
Figure 27:
FIG. 27 shows effect of HPMC on the separation of the Cu and water in the ink.
Figure 27:
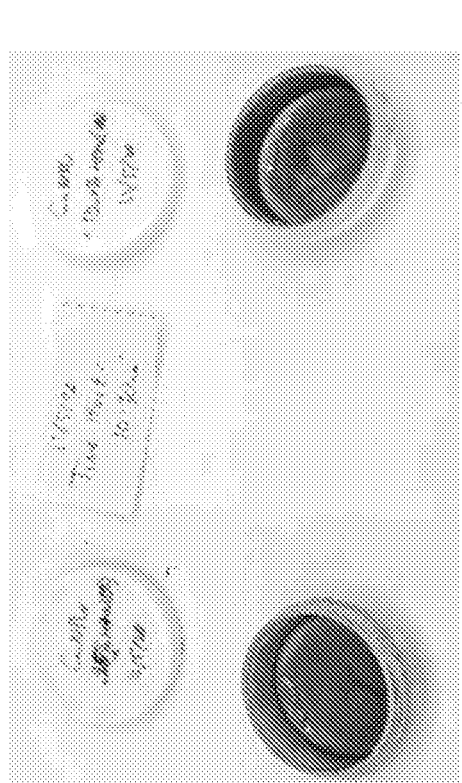
Figure 28:
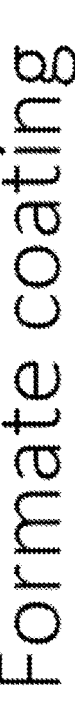
FIG. 28 shows corrosion treatment of Cu NPLs and Cu-FA with sodium hydroxide.
Figure 28:
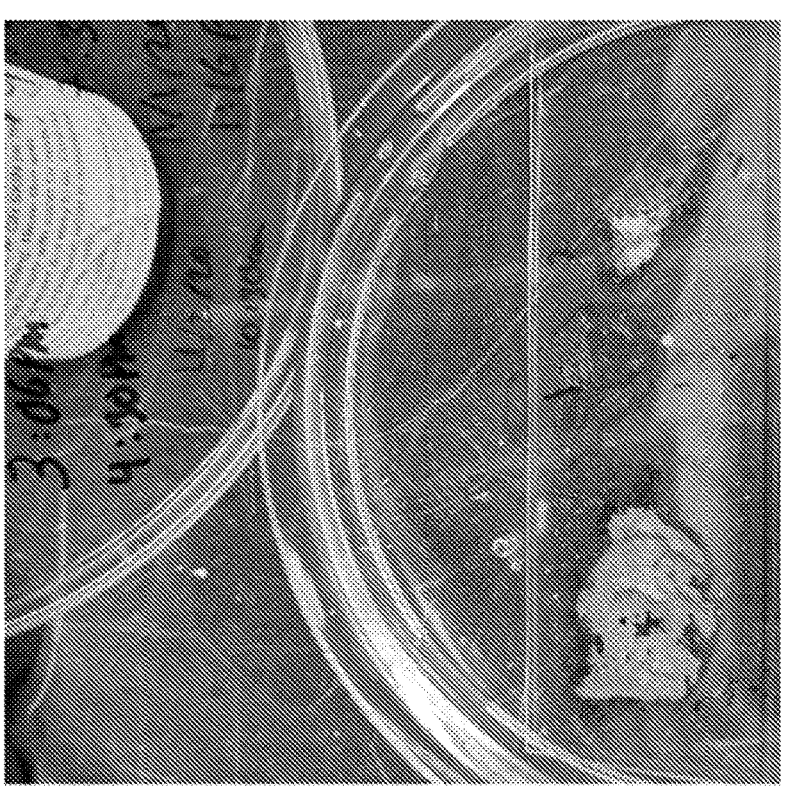
Figure 28:
Figure 29:
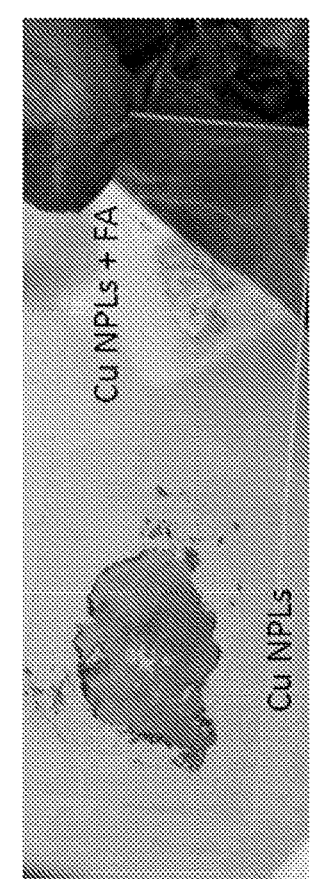
FIG. 29 shows front (left) and back (right) views of the samples after corrosion treatment.
Figure 29:
Figure 30:
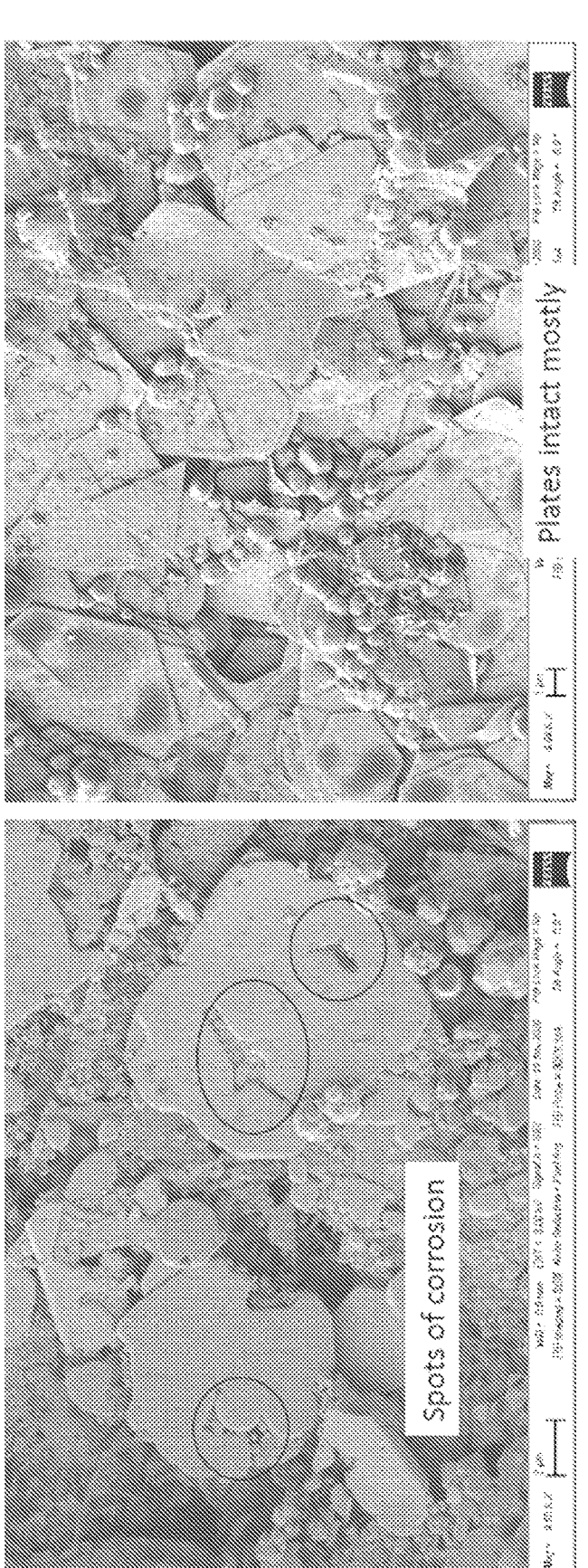
FIG. 30 shows SEM images of Cu NPLs (left) and Cu-FA (right) after corrosion treatment.
Figure 31:
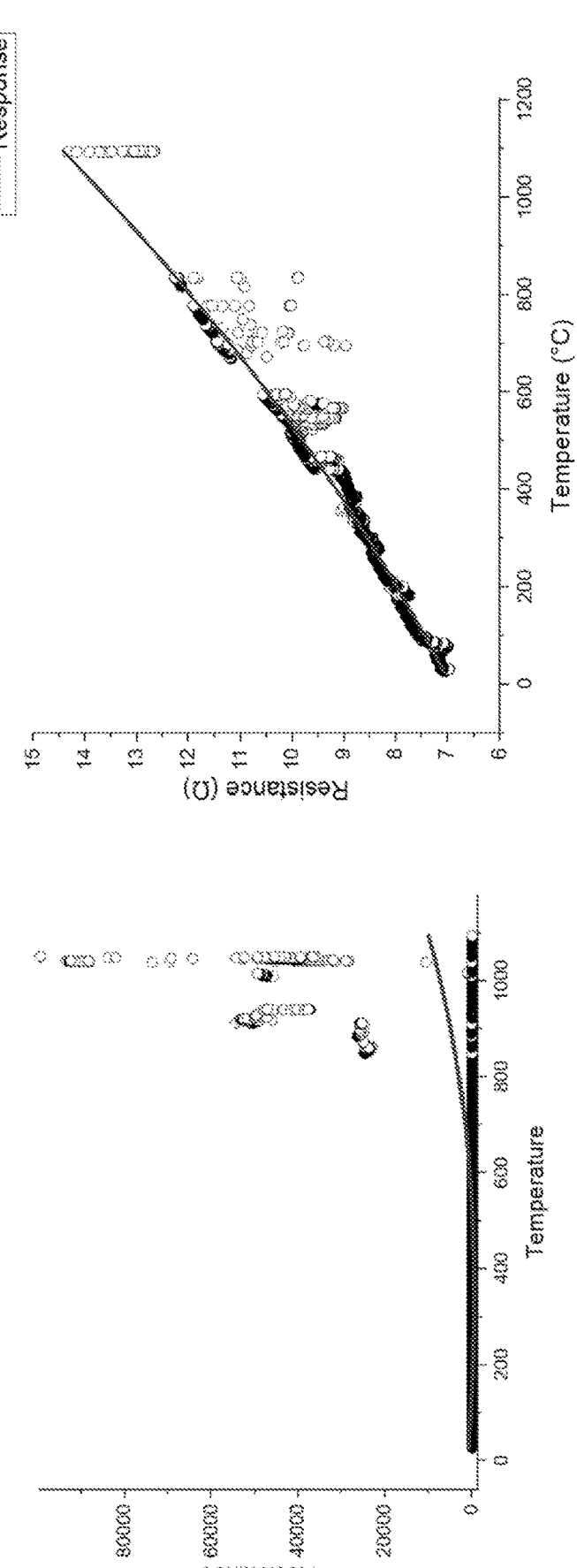
FIG. 31 shows high temperature (up to 1100° C.) testing of Cu-G conductors. The graphs show the measurements with artifacts (left) and after removal of the artifacts (right).

X-ray photoelectron spectroscopy (XPS) can be utilized in determining present elements and their chemical environments of printed Cu-G conductors (FIG. 17). The Cu 2p XPS spectrum (FIG. 18) contains one peak corresponding to pure Cu metal at 933 eV in both sintered and unsintered prints. The Cu 2p FWHM of the unsintered film is 1.86 eV after sintering this peak decreased to 0.95 eV, indicating the bonding became more ordered after sintering. Additionally, there was no evidence of oxides, shown through the lack of any satellite peaks around binding energy range of 940-950 eV. These observations clearly indicate that the Cu sample, unsintered and sintered Cu-G, are of highly pure Cu metal. The C 1s XPS spectrum corresponds either the graphene (sintered, FIG. 5$b$) or for polydopamine (unsintered, FIG. 19). For the unsintered sample the C Is spectrum is deconvolved into three peaks around 284.80, 285.89, and 288.04 eV which corresponded to C—C, C—O, and C═O functional groups, respectively. The sintered Cu-G sample (FIG. 5$b$), on the other hand, once deconvolved clearly indicates six different chemical environments around 284.87, 286.21, 288.51, 287.42, 289.54, and 291.27 eV corresponding to sp$^2$ and sp$^3$ carbons, C—O, C—NH$_x$, C—O, COO, and O—COO functional groups, respectively (binding energies shown in supporting information FIG. 19). The binding energy for similar functional groups have shifted slightly, further indicating changes in the chemical environment. Additionally, polydopamine has a ratio of 1:3 of C═O: C—O functional groups: the C 1s XPS peaks gives a ratio of 1:3.3, indicating that polydopamine is present. To further support the in-situ conversion of dopamine to graphene. N 1s XPS spectrum (FIG. 20) was investigated. The unsintered sample showed one peak at 399.61 eV which corresponds to pyridinic/pyrollic N. Once sintered, an additional peak appeared at 401.00 eV corresponding to graphitic N, indicating the successful formation of nitrogen-doped graphene of printed Cu-G conductor. The XPS data have clearly shown that printed Cu conductors are purely metallic, before and after sintering, as well as confirming the presence and conversion of polydopamine to nitrogen-doped graphene. In addition to interpreting the X-ray diffraction pattern of Cu-G conductors (FIG. 12), crystal tilt orientation teased out information regarding how the Cu NPLs are stacked. Mapping the crystal tilt (FIG. 5$c$) for the (111) plane (43.3°) in both sintered and unsintered prints, there is a relatively broad spectrum with the peak intensity at 270°, corresponding to the sample normal. The anisotropy in the Debye ring indicates the preferential orientation of the Cu NPLs, where the narrower peaks suggested that the alignment between the Cu NPLs is increased. The corresponding FWHM for the sintered and unsintered prints are 4° and ~10°, respectively, suggesting that once sintered the Cu NPLs are oriented in roughly the same direction and preferentially stacked on top of one another.

Conclusions

Described are single-crystalline Cu (111) nanoplates as the building block for the development of anti-oxidation Cu conductors with high conductivity and stability under extreme environments. Further described are two hybridization strategies for printed Cu conductors: one involving formate passivation to show anti-oxidation and anti-corrosion and the other with in-situ conversion of dopamine to graphene displaying a remarkable stability at high temperatures (1400° C.), exceeding the melting point of bulk copper (1084° C.). The printed Cu conductors display a high electric conductivity of $4 \times 10^6$ S/m (which is 10× lower than bulk copper) and the sheet resistance of 4 mΩ/sq/mil, which can be printed onto a variety of flexible substructures, including high temperature Kapton®; plastics and flexible Ribbon Ceramics substrates. The Cu-G conductor displays an approximate 20-fold increase in the current carrying capacity when directly compared with Cu conductor. Further demonstrated is the surface formate passivation and in-situ graphene formation, are compatible with the batch-based printable electronics manufacturing. Also investigated was the role of graphene in regards to improving the stability at high temperatures through computational modeling and in-situ spectroscopy studies. The findings shown here represent a new conductor material building block, and promising strategies to address materials reliability issues for printed electronics at high temperatures. These observations depict that the hybridized copper conductors described here feature anti-oxidation and anti-corrosion properties and stability at elevated temperatures. It is considered that the materials may be suitable for printed miniaturized electronics applications. Moreover, the ease of manufacturing and scalability reckons them desirable candidates for advanced electronics.

Methods/Experimental

Synthesis of Cu NPLs. The precursor was made by adding copper chloride dihydrate ($CuCl_2 \cdot 2H_2O$, 2.4 g), D-glucose ($C_6H_{12}O_6$, 3.9 g), hexadecylamine (HDA. 14.55 g), and sodium iodide (NaI, 90 mg) were added to 900 mL of DI water and mechanically stirred for 12 hours (hrs) to obtain a uniform emulsion. 600 mL of the above solution was heated in an autoclavable glass bottle for 12 hrs at 100° C. unless specified. In the precursor. HDA acted as a coordinating ligand to $CuCl_2$ and forms $Cu^{2+}$-HDA complex. When the precursor was heated up. $Cu^{2+}$ is gradually reduced to $Cu^0$ by glucose, forming Cu seeds in the solution. When the Cu seeds grow, iodides preferentially adsorb onto the {111} facets, effectively forcing growth parallel to the basal plane.

The Cu NPL solids are collected via centrifugation at 5000 rpm for 5 minutes. The solids obtained from centrifugation were redispersed in DI $H_2O$. and filtered with a 180 μm membrane to remove any material left bigger than said membrane. Finally, the Cu NPLs will be centrifuged to collect the solids and further cleaned with the addition of DI $H_2O$ and ethanol at a 1:1 ratio and then the ink feedstock was collected via centrifugation.

Copper (graphene) ink preparation. After obtaining the ink feedstock, hydroxypropyl methylcellulose (HPMC) solution (2 wt. % in DI $H_2O$), DI $H_2O$ and Cu semisolid feedstock was added together to make a conductive ink. The concentrations of HPMC solution (2-20 wt. %) and Cu NPLs (0.9, 6, 8.3, and 20 wt. %) are varied, with water comprising the remaining portion of the ink. This mixture was then mixed in the Thinky Mixer (ARE-310) to achieve a homogenous ink. If copper-graphene ink (FIG. 1a scheme) was being prepared, dopamine would be added after the homogenous ink was first mixed. Varying amounts of dopamine were added and again mixed to achieve a homogenous ink mixture.

Direct writing through Voltera V-One was utilized for printing the conductive inks. The ink is printed via extrusion method where the conductive ink is forced out through the nozzle onto the substrate. The substrates used are plastics (PET and Kapton®) and flexible Ribbon Ceramic (YSZ for Cu and Cu-FA and Alumina Ribbon Ceramic for Cu-G). After printing, the conductor was kept under ambient conditions, allowing the water to evaporate. Following this, the prints were sintered at 300° C. (800° C. for copper-graphene) under forming gas (95% Ar and 5% $H_2$). This process promotes contact and removal of residual organics on the surface (in addition, 800° C. promotes the in-situ conversion of polydopamine to graphene).

Post-sintering formate treatment. FIG. 3a illustrates the post-sintering treatment with formate. For the formate treatment, a solution containing 50 mL of ethylene glycol and 4 mL of formate solution (30 g sodium formate and 15 mg of copper formate dissolved in 150 mL DI $H_2O$) was first added in an autoclavable glass bottle. The sintered Cu NPL prints were then submerged into the solution before heat treatment in a 120° C. oven for 12 hours. The resulting print was then cleaned by submerging in ethanol and water to clean off excess ethylene glycol and salt, respectively, before being dried gently with air.

Computational methods. First-principles calculations are performed by VASP code with the plane-wave implementation of the PBE generalized gradient functional. The non-local correlation functional vdW-DF is included for the long-range van der Waals interaction. The atomic structures are optimized until the forces are less than 0.01 eV/A. and the self-consistent energies are converged to 105 eV. The vacuum thickness is set to 15 Å to prevent from interactions between periodic images. The plane-wave cutoff energy is set to 400 eV. Ab initio Born-Oppenheimer molecular dynamic simulations are performed with Nose-Hoover dynamics (Nose Q=2, smearing=0.04). The NVT ensemble is used in the simulations. The simulations run for up to 10 ps with a time step of 1.0 fs.

Example 2

This example provides a description of the compositions of the present disclosure.

FIGS. 21-31 provide various features of the present disclosure.

Although the present disclosure has been described with respect to one or more particular embodiments and/or examples, it will be understood that other embodiments and/or examples of the present disclosure may be made without departing from the scope of the present disclosure.

The invention claimed is:

1. A conductive slurry composition comprising a slurry of copper nanoplates in water, wherein the copper nanoplates comprise copper or a copper alloy and the conductive slurry composition comprises less than 10 wt. % copper nanowires, and wherein the copper nanoplates are surface functionalized with one or more formate groups.

2. The conductive slurry composition according to claim 1, wherein the copper nanoplates have a longest linear dimension of 100 nm to 10 μm.

3. The conductive slurry composition according to claim 1, wherein the copper nanoplates have a thickness of 10 to 100 nm.

4. The conductive slurry composition according to claim 1, wherein the copper alloy is a copper gold alloy, a copper silver alloy, a copper zinc alloy, a copper aluminum alloy, a copper nickel alloy, or a copper platinum alloy.

5. The conductive slurry composition according to claim 1, wherein the copper nanoplates further comprise iodide.

6. The conductive slurry composition according to claim 1, further comprising (hydroxypropyl)methyl cellulose (HPMC) and the concentration of HPMC is 0.1 to 10 weight percent, relative to the total weight of the conductive ink.

7. The conductive slurry composition according to claim 1, wherein the copper nanoplates are functionalized with graphene or a graphene material.

8. The conductive slurry composition according to claim 1, wherein the conductive slurry composition is a conductive ink.

9. A method of printing a conductive ink, comprising:

extruding a conductive ink composition according to claim 8; and washing the extruded ink with an acid to remove residual aliphatic amine.

10. The method according to claim 9, wherein the acid is an organic acid.

11. A conductor printed using a conductive slurry composition according to claim 1.

\* \* \* \* \*